(12) United States Patent  
Kolmakov et al.

(10) Patent No.: US 12,481,200 B2
(45) Date of Patent: *Nov. 25, 2025

(54) EXCITON POLARITON OPTICAL INTERCONNECT

(71) Applicant: Research Foundation of the City University of New York, New York, NY (US)

(72) Inventors: German V. Kolmakov, Bellerose, NY (US); Shaina E. Raklyar, Brooklyn, NY (US)

(73) Assignee: Research Foundation of the City University of New York, New York, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/411,355

(22) Filed: Jan. 12, 2024

(65) Prior Publication Data

US 2024/0385493 A1    Nov. 21, 2024

Related U.S. Application Data

(63) Continuation-in-part of application No. 17/355,330, filed on Jun. 23, 2021, now Pat. No. 11,874,581.

(60) Provisional application No. 63/045,094, filed on Jun. 27, 2020.

(51) Int. Cl.
*G02F 1/313* (2006.01)

(52) U.S. Cl.
CPC .................. *G02F 1/3132* (2013.01)

(58) Field of Classification Search
CPC .... G02F 1/3132; G02F 1/025; G02F 2203/10; B82Y 10/00; B82Y 20/00
USPC ........................................................ 385/1–3
See application file for complete search history.

(56) References Cited

U.S. PATENT DOCUMENTS

| | | | |
|---|---|---|---|
| 2004/0184703 A1* | 9/2004 | Bakir | G02B 6/262 385/14 |
| 2016/0005588 A1* | 1/2016 | Park | G02B 27/141 313/231.31 |
| 2020/0057354 A1 | 2/2020 | Cao et al. | |
| 2021/0217919 A1 | 7/2021 | Unuchek et al. | |
| 2021/0405398 A1 | 12/2021 | Kolmakov et al. | |

OTHER PUBLICATIONS

Amo, A. et al.,; Collective fluid dynamics of a polariton condensate in a semiconductor microcavity; Nature; Jan. 2009; pp. 291-296; vol. 457.
Berman, O. et al.; Harnessing the Polariton Drag Effect to Design an Electrically Controlled Optical Switch; ACSNano; Sep. 29, 14; pp. 10437-10447; vol. 8., No. 10.

(Continued)

*Primary Examiner* — Robert Tavlykaev
(74) *Attorney, Agent, or Firm* — Peter J. Mikesell; Schmeiser, Olsen & Watts, LLP

(57) ABSTRACT

An electro-optical converter that converts an electric signal to an optical signal. An optical signal is dragged from one optical channel to another optical channel using exciton polaritons that are generated in a layer that is adjacent the optical channels. The exciton polaritons are generated in response to an electrical signal which thereby results in the selective production of the optical signal.

20 Claims, 23 Drawing Sheets
(3 of 23 Drawing Sheet(s) Filed in Color)

(56) References Cited

OTHER PUBLICATIONS

Cotlet, O. et al.; Transport of Neutral Optical Excitations Using Electric Fields; Physical Review X; Oct. 25, 2019; pp. 041019-1-041019-33; vol. 9.
Cristofolini, P. et al.; Coupling Quantum Tunneling with Cavity Photons; Science; May 11, 2012; pp. 704-707; vol. 336.
Hopfield, J.J.; Resonant Scattering of Polaritons as Composite Particles; Physical Review; Jun. 15, 1969; pp. 945-9521 vol. 182, No. 3.
Kasprzak, J. et al.; Bose-Einstein condensation of exciton polaritons; Nature; Sep. 28, 2006; pp. 409-414; vol. 443.
Kim, N Y, et al.; Exciton-polariton condensates near the Dirac point in a triangular lattice; New Journal of Physics; Mar. 27, 2013; 14 Pages; vol. 15.
Lilly, M.P. et al.; Coulomb Drag in the Extreme Quantum Limit; Physical Review Letters; Feb. 23, 1998; pp. 1714-1717; vol. 80, No. 8.
Liu, X. et al.; Strong light-matter coupling in two-dimensional atomic crystals; Nature Photonics; Dec. 23, 2014; pp. 30-34; vol. 9.
Su, J. et al.; How to make a bilayer exciton condensate flow; Nature Physics; Aug. 24, 2008; pp. 799-802; vol. 4.
Mak, K. et al.; Tightly bound trions in monolayer $MoS_2$; Nature Materials; Dec. 2, 2012; pp. 207-211; vol. 12.
Negoita, V. et al.; Harmonic-potential traps for indirect excitons in coupled quantum wells; Physical Review B; Jul. 15, 1999; pp. 2661-2669; vol. 60, No. 4.
Nelsen, B. et al.; Dissipationless Flow and Sharp Threshold of a Polariton Condensate with Long Lifetime; Physical Review X; Nov. 21, 2013; pp. 041015-1-041015-8; vol. 3.
Rivera, P. et al.; Observation of long-lived interlayer excitons in monolayer $MoSe_2$—$WSe_2$ heterostructures; Nature Communications; Feb. 24, 2015; 6 pages.
Ross, J. et al.; Electrical control of neutral and charged excitons in a monolayer semiconductor; Nature Communications; Feb. 12, 2013; 6 pages.
Snoke, D.; Spontaneous Bose Coherence of Excitons and Polaritons; Science; Nov. 15, 2002; pp. 1368-1372; vol. 298.
Splendiani, A. et al.; Emerging Photoluminescence in Monolayer $MoS_2$; Nano Letters; Mar. 15, 2010; pp. 1271-1275; vol. 10.
Wang, K. et al.; Electrical control of charged carriers and excitons in atomically thin materials; Nature Nanotechnology; Feb. 2018; pp. 128-132; vol. 13.
Xiao, D. et al.; Coupled Spin and Valley Physics in Monolayers of $MoS_2$ and Other Group-VI Dichalcogenides; Physical Review Letters; May 7, 2012; pp. 196802-1-196802-5; vol. 108.
Xu, X.; Spin and pseudospins in layered transition metal dichalcogenides; Nature Physics; Apr. 30, 2014; pp. 343-350; vol. 10.
Byrnes, T. et al.; Effective interaction and condensation of dipolaritons in coupled quantum wells; Physical Review B; Sep. 23, 2014; pp. 125314-1-125314-10.
Serafin, P. et al.; Driven dipolariton transistors in Y-shaped channels; Physics Letters A; Sep. 3, 2020; 6 pages; vol. 384.
Peyskens, F. et al.; Waveguide-coupled Localized Excitons From an Atomic Monolayer Integrated on a Silicon Nitride Photonic Platform; 21st European Conference on Integrated Optics (ECIO 2019), Proceedings, 2019.; 3 pages.
Berman, O. et al.; On nonlinear dynamics of a dipolar exciton BEC in two-layer graphene; Physics Letters A; Oct. 27, 2012; pp. 3664-3667.
Otten, M. et al.; Optical detection and storage of entanglement in plasmonically coupled quantum-dot qubits; Physical Review A; Mar. 25, 2019; 99, 032339; https://doi.org/10.1103/PhysRevA.99.032339.

\* cited by examiner

EXCITON POLARITON OPTICAL INTERCONNECT

CROSS-REFERENCE TO RELATED APPLICATIONS

This application claims priority to and is a continuation-in-part of U.S. patent application Ser. No. 17/355,330 (filed Jun. 23, 2021) which is a non-provisional of U.S. Patent Application 63/045,094 (filed Jun. 27, 2020), the entirety of which are incorporated herein by reference.

STATEMENT OF FEDERALLY SPONSORED RESEARCH OR DEVELOPMENT

This invention was made with Government support under grant number W911NF1810433 and W911NF-22-S-0010 awarded by the US Department of Defense. The government has certain rights in the invention.

BACKGROUND OF THE INVENTION

A fully-functional quantum computer has the potential to be transformative by: 1) advancing the science of artificial intelligence, 2) stimulating advances in chemistry through creation of new materials and new drugs, and 3) revolutionizing the surveillance and secure transmission of information. With quantum simulations, it was discovered that the very fundamental laws of physics can be revisited; for example, the direction of time can be temporarily reversed. This means that one can return back to the past for a limited amount of time, although at a microscopic scale.

Early prototypes of quantum computers do exist but in their current form they do not outperform existing computers. Many companies around the world are investing in this technology but a fully functional quantum computer is still a decade away.

The key limitation of the current quantum computing technology is in the absence of scalability in quantum computers that is, the maximum achievable number of simultaneously connected qubits in quantum processors. Qubits are quantum bits, or electrical or optical pulses representing zero and/or one. Qubits have the flexibility of performing many calculations simultaneously. Currently, the maximum obtained number of qubits, 72 in a single computer, is not large enough to achieve required performance for commercial, financial, cybersecurity, or military applications. An improved system is therefore desired.

The discussion above is merely provided for general background information and is not intended to be used as an aid in determining the scope of the claimed subject matter.

SUMMARY

This disclosure provides an electro-optical converter that converts an electric signal to an optical signal. An optical signal is dragged from one optical channel to another optical channel using exciton polaritons that are generated in a layer that is adjacent the optical channels. The exciton polaritons are generated in response to an electrical signal which thereby results in the selective production of the optical signal.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

A low temperature electro-optical converter (EOC) unlocks a number of applications of quantum computing, communication and sensing. The polariton-based low-temperature low-energy EOC converts qubit/quantum information into optical pulses and back. The technology enables quantum data transfer between quantum computers or devices and to/from classical computing systems.

Figure 1A:
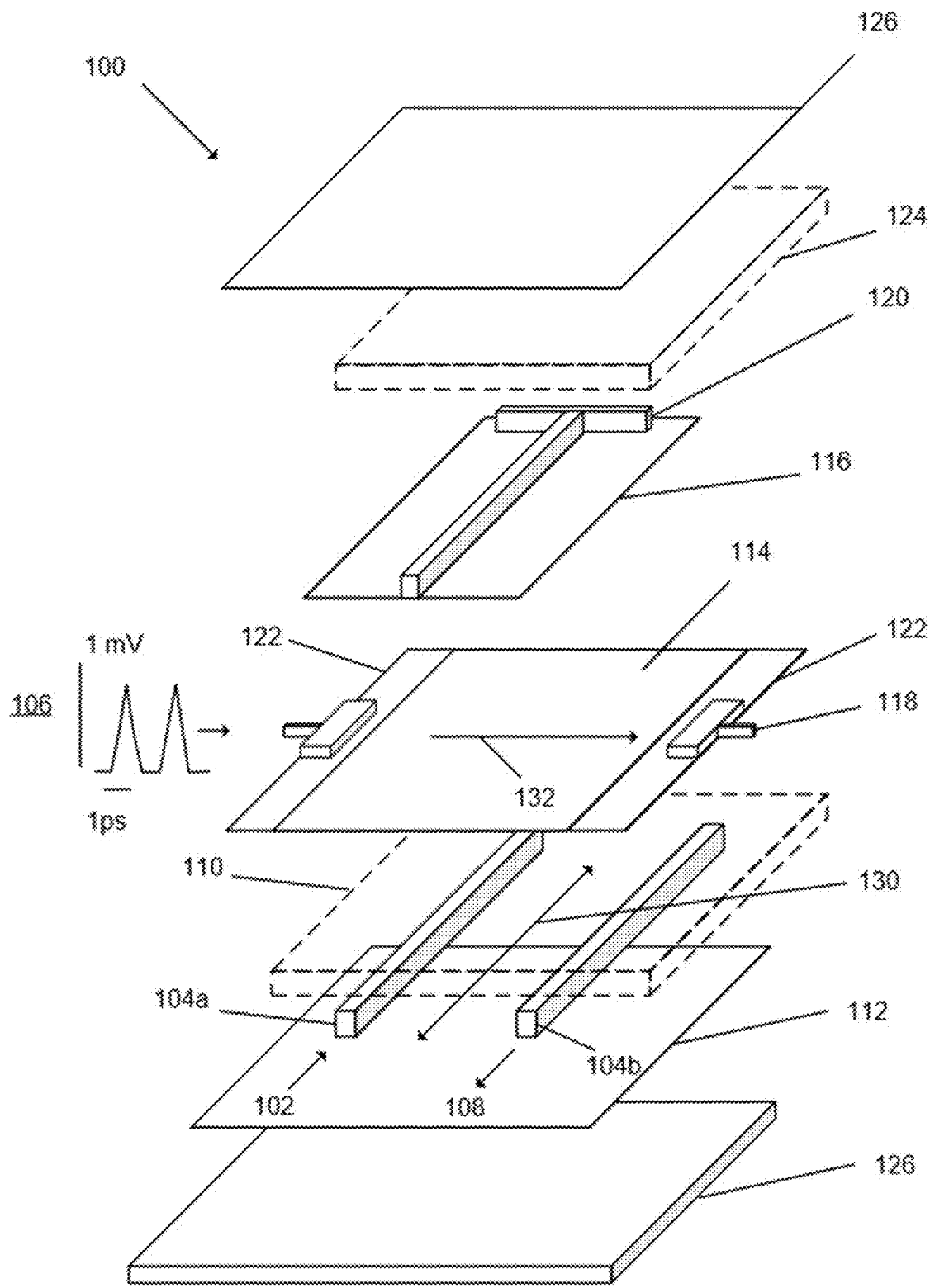
FIG. 1A is an exploded view of one electro-optical converter for use with the disclosed system.

FIG. 1A is an exploded view of an electro-optical converter (EOC) 100. During use, an input optical signal 102 enters the EOC 100 through an input waveguide (e.g. a continuous wave (cw) optical input waveguide). As the input optical signal 102 passes through an optical input channel 104a (e.g. a Si, plastic, or glass waveguide), the light is dragged in the direction of an applied pulsed electric signal 106 via polariton drag (from left to right in the figure) and finally, leaves an optical output channel 104b as an output optical signal 108 through a corresponding output waveguide. In the absence of the pulsed electric signal 106, light continues traveling through the optical input channel 104a. This results in the output optical signal 108 being selectively produced based on the presence of the electric signal 106. In this manner, the electric signal 106 is converted to the output optical signal 108.

In the embodiment of FIG. 1A, the optical channels 104a, 104b are embedded in a dielectric layer 110 which may be an inert material, such as $SiO_2$, air (for air-filled cavities), $Nb_2O_5$ or any other transparent material. The optical channels extend along a first longitudinal direction 130 The dielectric layer 110 is optically transparent to visible light. The dielectric layer 110 separates a first mirror 112 from a semiconducting layer 114 which has a first surface 114a and a second surface 114b, which is opposite the first surface. The first surface 114a is contiguous with the dielectric layer 110. In one embodiment, the semiconducting layer 114 is a TMX layer, wherein TM is a transition metal is W, Mo, In or Re and X is Se, $Se_2$ or $S_2$. In another embodiment, the semiconducting layer 114 is a semiconductor quantum well layer, such as GaAs/AlGaAs, ZnO, GaN, $Cu_2O$, or CuCl. The pulsed electric signal 106 applied to the semiconducting layer 114 is mixed with the input optical signal 102 due to strong coupling of cavity photons and semiconducting excitons then, propagates to the output channel 104b in a form of exciton polaritons that move in a second longitudinal direction 132 and finally, leaves the converter as optical pulses through the output optical signal 108. The second longitudinal direction 132 is perpendicular to the first longitudinal direction 130. In the absence of the electric signal 106, the input optical signal 102 leaves the optical channel 104a e and does not produce any optical output. The photon-exciton coupling strength can be maximized by setting the gate voltage and the inter-mirror distance to optimal values. The thickness of the semiconducting layer 114 can vary from a few angstroms (for monoatomic TMX layers) to 100 nm for semiconducting quantum well layers, such as GaAs/AlGaAs, ZnO, GaN, $Cu_2O$, or CuCl.

Figure 1B:
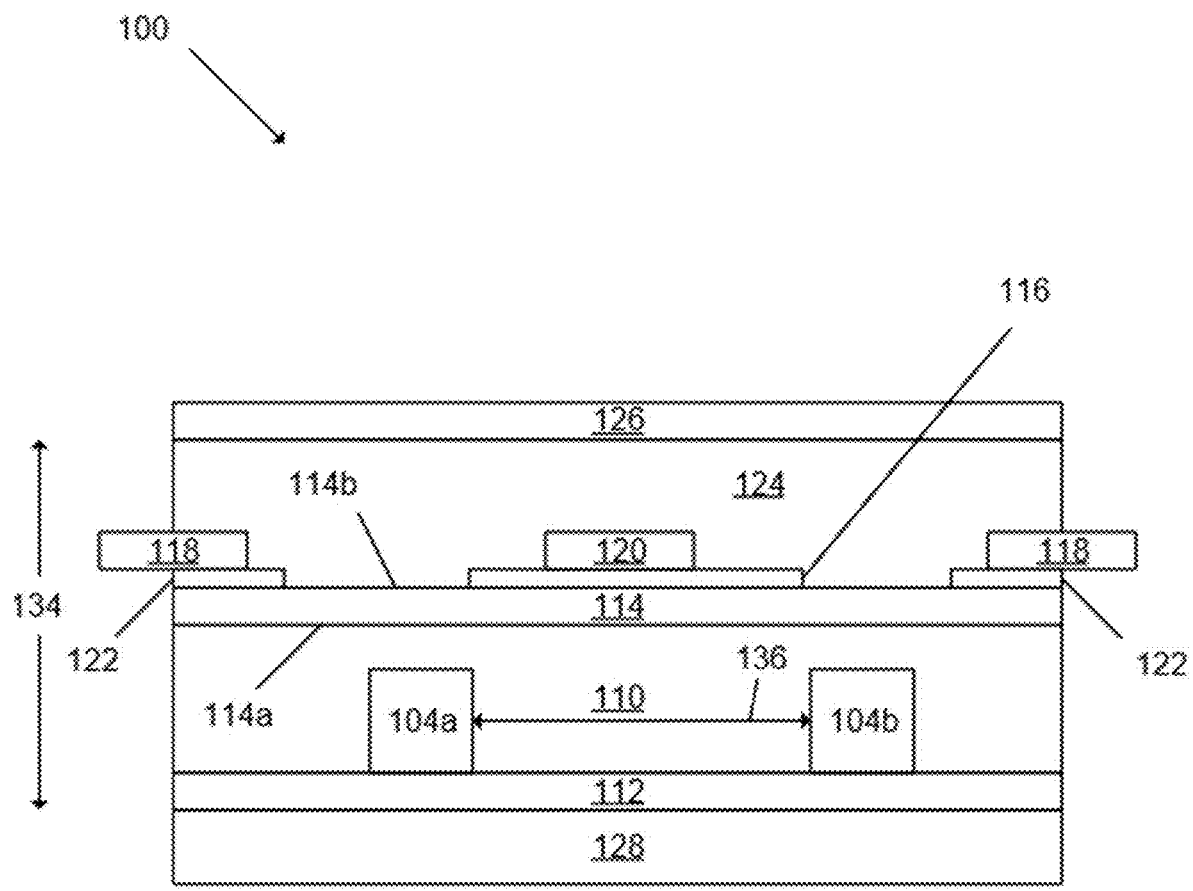
FIG. 1B is a cross section side view of the electro-optical converter.

The pulsed electric signal 106 is passed through the semiconductor layer 114. The semiconductor layer 114 has input and output electrical terminals 118 on opposite edges of the semiconductor layer 114. A conductive layer 122 (e.g. graphene) may be present between the semiconductor layer 114 and the input and output terminals 118, respectively, to facilitate electrical contact. A gate 120 can be made of a layer of conducting material, such as graphene or gold, and is electrically separated from the semiconducting layer 114 by a thin dielectric layer 116 (e.g. a hexagonal boron nitride, h-BN, dielectric, or $SiO_2$) of thickness from a few angstroms (e.g. 2 angstroms) to a hundred nanometers. In one embodiment, the thickness is from one nanometer to five hundred nanometers. The gate 120 and input and output electrical terminals 118 may be disposed in a dielectric layer 124 of a dielectric material (e.g. $SiO_2$) such that a portion of the electrical terminals 118 extend outside of the dielectric layer 124. The total thickness of the cavity 134 (the sum of the thicknesses of the dielectric layer 110 and the dielectric layer 124 plus the thickness of the semiconducting layer 114) between the first mirror 112 and the second mirror 126 can vary from a fraction of a micron (e.g. 0.5 microns) to a few microns (e.g. 3 microns). FIG. 1B is a cross section side view of EOC 100. The optical channels 104a, 104b are separated by a gap 136 which is on the order of hundreds of microns (e.g. between 200 microns and 600 microns). In one embodiment, the semiconductor layer 114 is disposed within the central third of the cavity 134. In another embodiment the semiconductor layer 114 is disposed is the middle of the cavity 134.

The gate 120 may also be deposited on a second mirror 126 or below a first mirror 112 outside the cavity. The dielectric layers 110 and 124 are optically transparent. In one embodiment, the second mirror 126 is parallel to the first mirror 112. In another embodiment, the second mirror 126 is slanted as a small angle (for example, from 0.01 degree to 5.0 degree) with respect to the first mirror 112 to produce a wedge-shaped microcavity. In another embodiment, the first mirror 112 is slanted by the small angle with respect to the second mirror 126. The gap between the first mirror 112 and the second mirror 126 defines the cavity that contains the components of the EOC 100. The entire system may be supported on a substrate 128.

Application of emerging two-dimensional materials enables one to significantly expand the temperature range at which the disclosed technology is working. Examples of such materials include transition metal dichalcogenides and monochalcogenides (e.g., molybdenum disulfide and diselenide, and indium selenide), in which, in contrast to standard GaAs quantum wells, polaritons are stable up to the room temperature. The use of these materials includes, but is not limited to, the following room-temperature applications: (1) Conversion of electric signal to optical signal for broadband optical data transmission, e.g., in broadband optical internet; (2) Connection of compute nodes in high-speed computer networking communication systems in data centers and in local area network (LAN) and (3) Connection of compute nodes in graphic processing units (GPU) clusters.

Additionally, the disclosed high-speed low-latency low-energy exciton polariton optical interconnect enables the following low temperature and cryogenic applications: (1) Interconnect multiple quantum computers into a large quantum computer cluster thus providing enhanced computational capabilities of the quantum computers; (2) Connect the low-temperature module of quantum computers at T=4 K with room-temperature (RT) electronics via the optical fiber thus allowing to remove low-temperature electronic modules from the information transmission lines including those residing at T=77 K stage (3) Connect low-temperature modules of cryogenic and low-temperature computational electronics systems via the optical channel and (4) Interconnect optical computational systems (including optical quantum computers) with the peripheral electronics via the optical channel.

The disclosed EOC also enables one to interconnect multiple quantum processors in one large quantum computing cluster—much like classical computer nodes are connected to a high-performance cluster. This way the total number of simultaneously interconnected qubits can be increased significantly which unlocks the transformative applications listed above.

Scientific Background

Figure 2A:
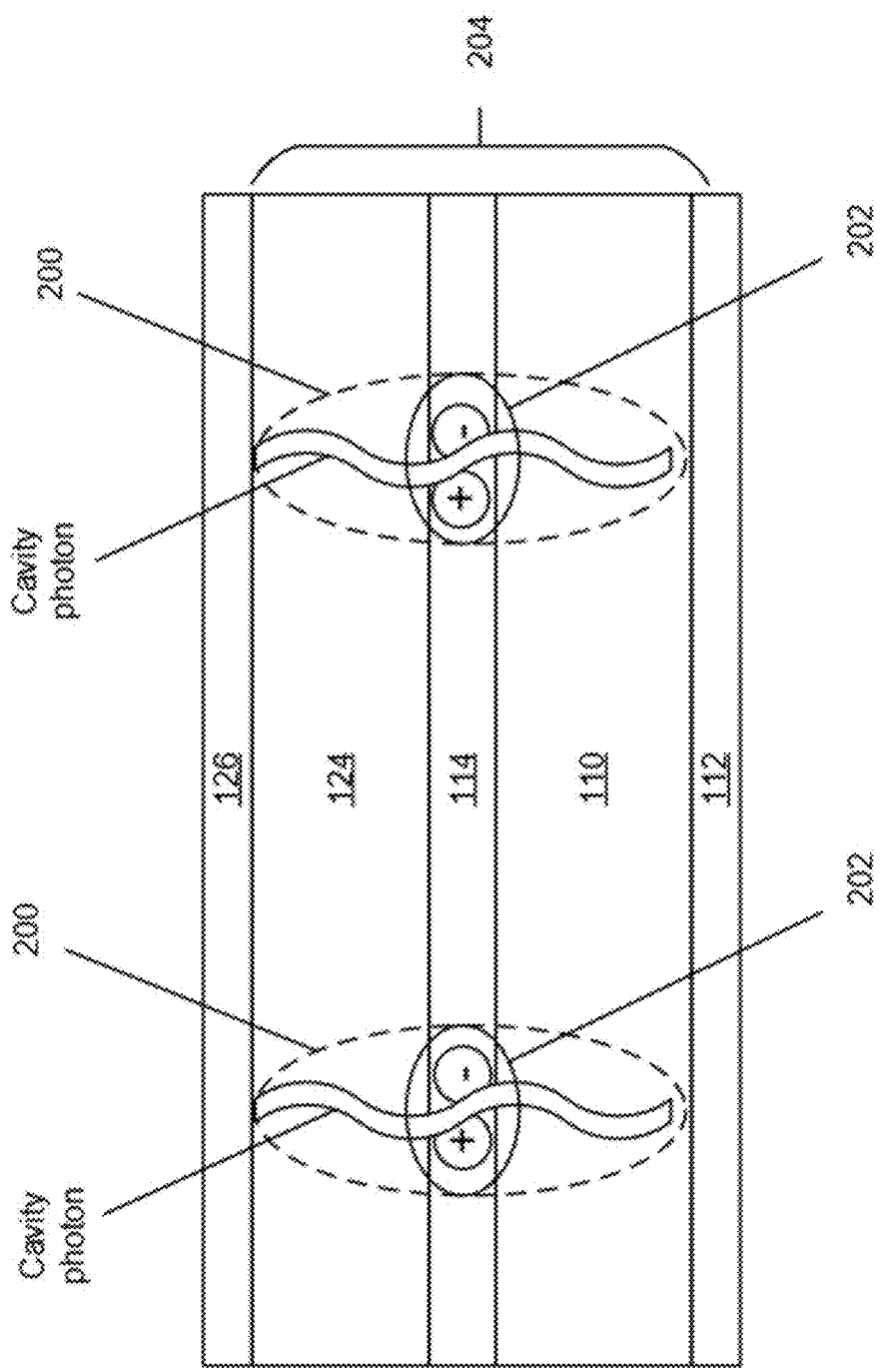
FIG. 2A is a cross section side view of the electro-optical converter showing cavity photons.

Exciton polaritons in an optical cavity: Polaritons 200 are half-matter half-light quasiparticles in an optical microcavity, which embeds electronic transition material. Excitons 202 (i.e., the matter part of polaritons) are located in a semiconducting quasi-two-dimensional TMX layer placed in the anti-node of the confined optical mode in a planar cavity 204. The cavity 204 is formed by two parallel high-quality mirrors. The geometry of the optical cavity is shown in FIG. 2A.

Figure 2B:
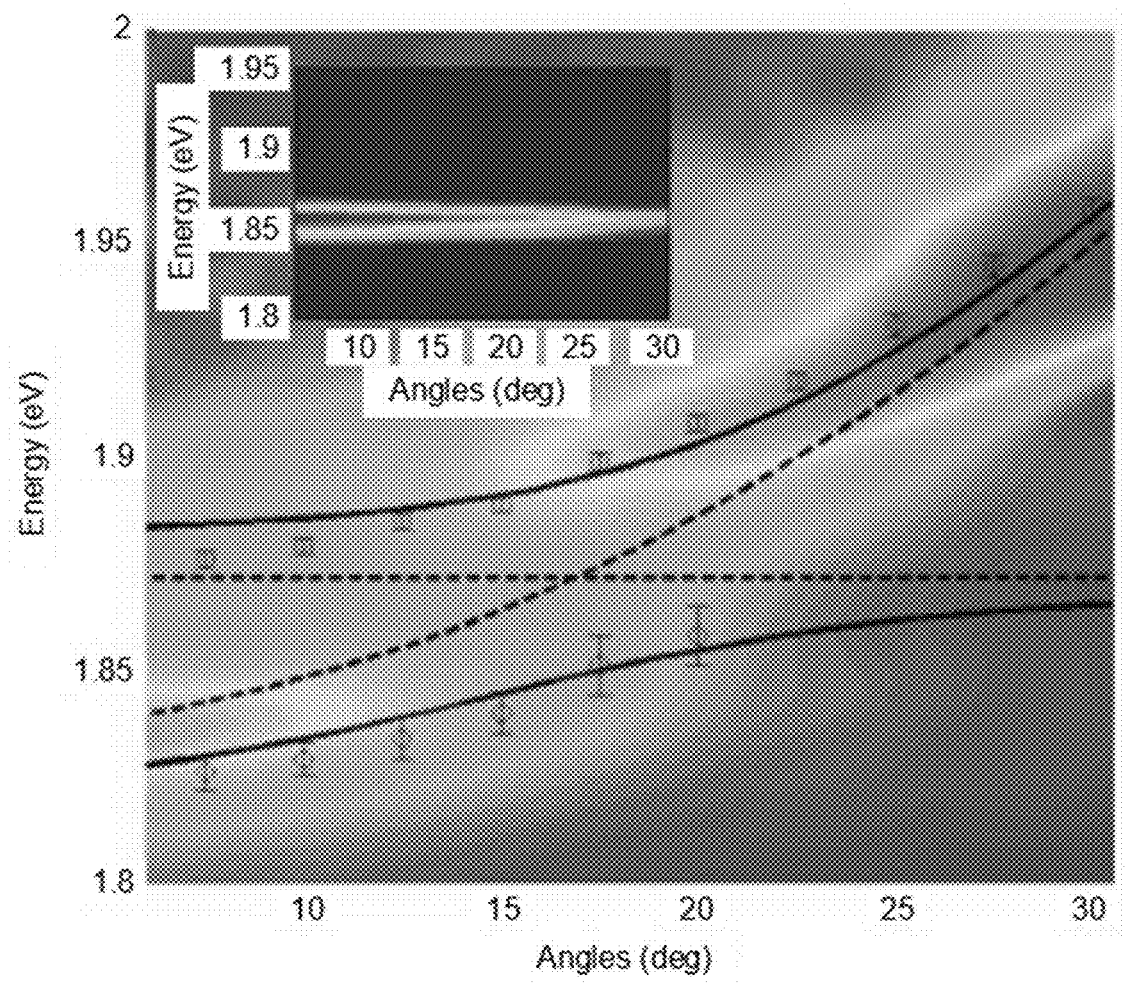
FIG. 2B is a photoluminescence (PL) spectrum of the electro-optical converter.
Figure 2C:
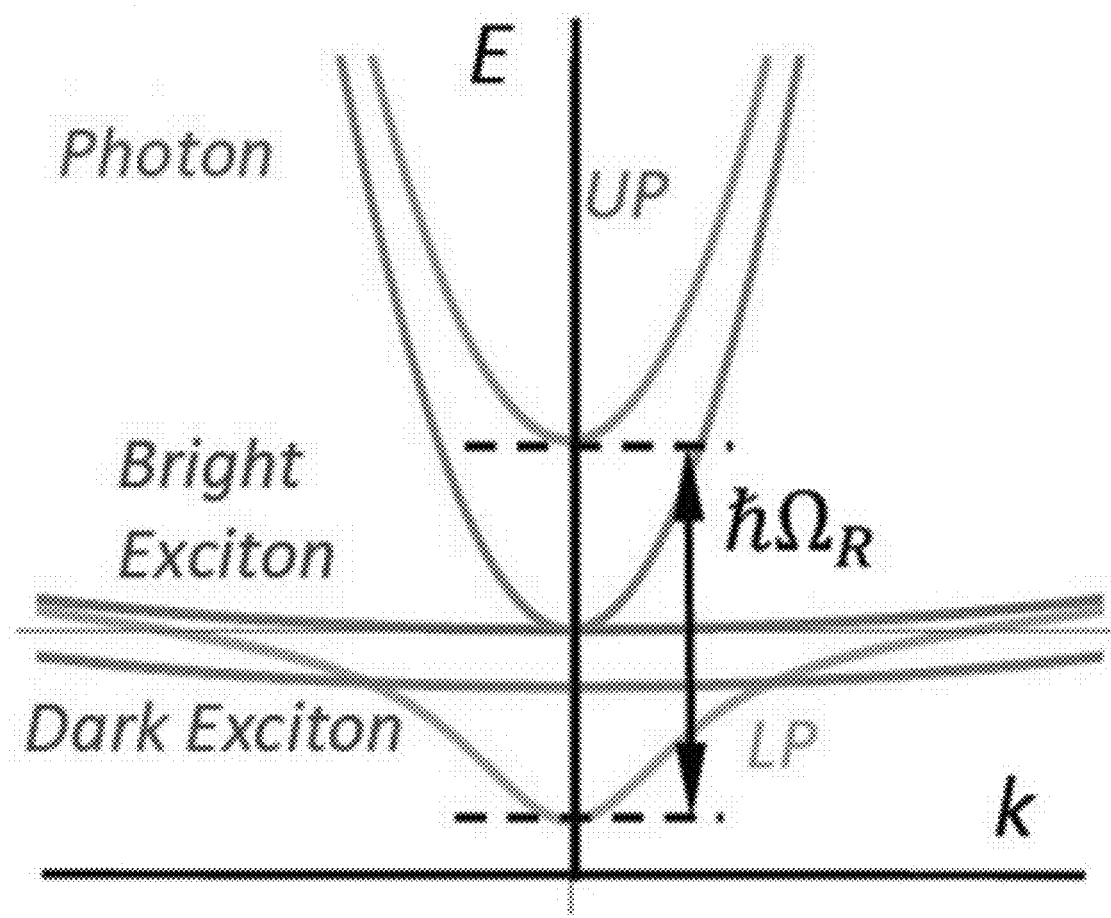
FIG. 2C is a graph depicting polariton energy for two polariton branches.

In a single-layer TMX, the electronic states demonstrate strong spin-orbit (SO) splitting that results in two exciton branches: bright excitons that couple electrons and holes from the same SO valley, and dark excitons that couple different SO valleys. The bright excitons are coupled with the cavity modes with the coupling energy (Rabi splitting) $\sim\Omega_R \geq 40$ meV. The photoluminescence (PL) spectrum in FIG. 2B shows well-pronounced hybridization of exciton and photon modes into polariton quasiparticles. In the disclosed approach, optical pumping is used thus, the dark excitons are not excited and, therefore, they are excluded from the over-all dynamics. The polariton wave function $\Psi(r,t)$ is a quantum superposition of the cavity photon mode $\varphi(r,t)$ and the bright exciton mode $\psi(r,t)$, $$\Psi(r, t) = c_k \varphi(r, t) + X_k \psi(r, t) \tag{1}$$

with $C_k$ and $X_k$ to be the respective cavity photon and exciton Hopfield coefficients, which depend on the polariton in-plane wave vector k. The photon and exciton fractions in polaritons, $|C_k|^2$ and $|X_k|^2$, can be varied in a controllable way from 0% to 100% by changing the width of the cavity. Since polaritons interact with the neighboring electric currents via their excitonic component, $|X_k|^2$, this enables one to tune the relevant interactions by setting the inter-mirror distance to the optimal value. The polariton energy E for the two polariton branches—upper polaritons (UP) and lower polaritons (LP)—is shown in FIG. 2C.

Figure 3A:
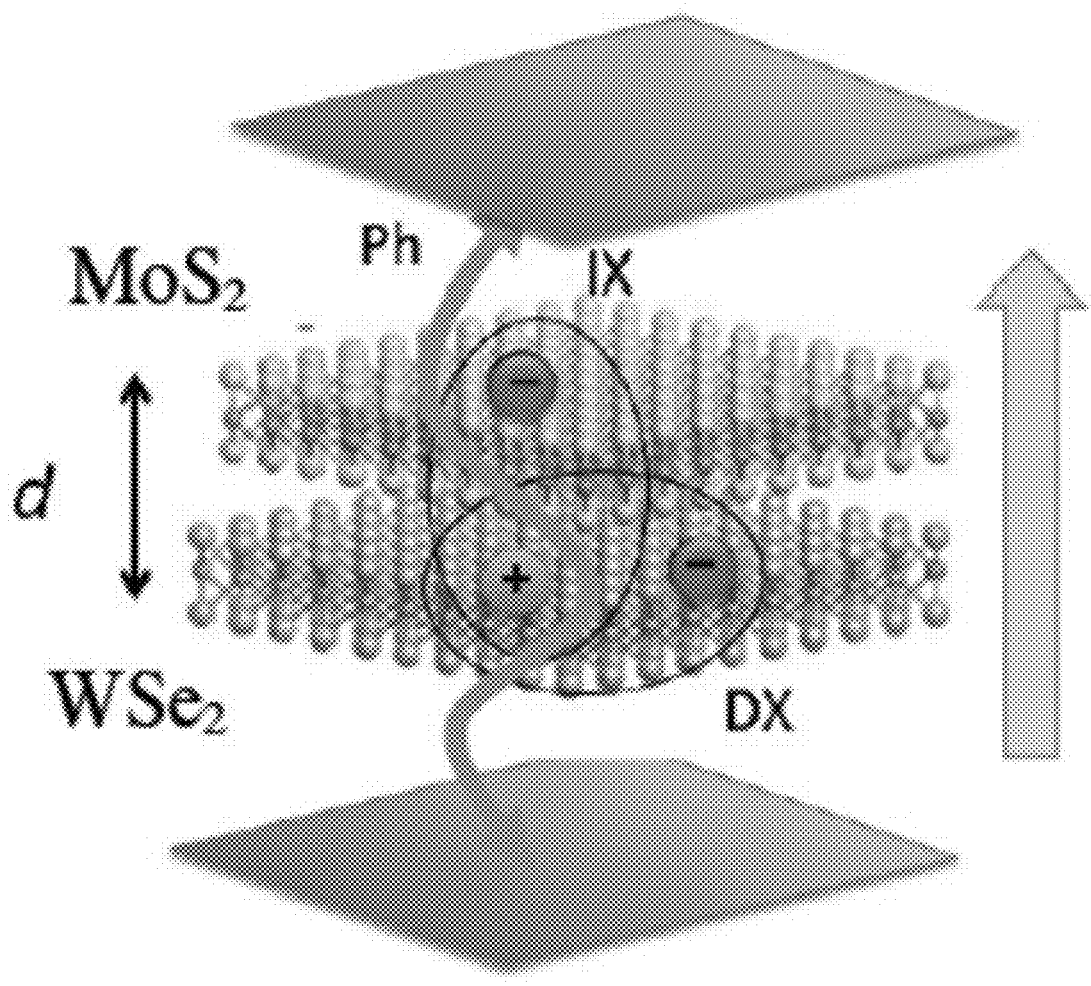
FIG. 3A is schematic depiction of an electro-optical converter that utilizes a heterogeneous bi-layer.
Figure 3B:
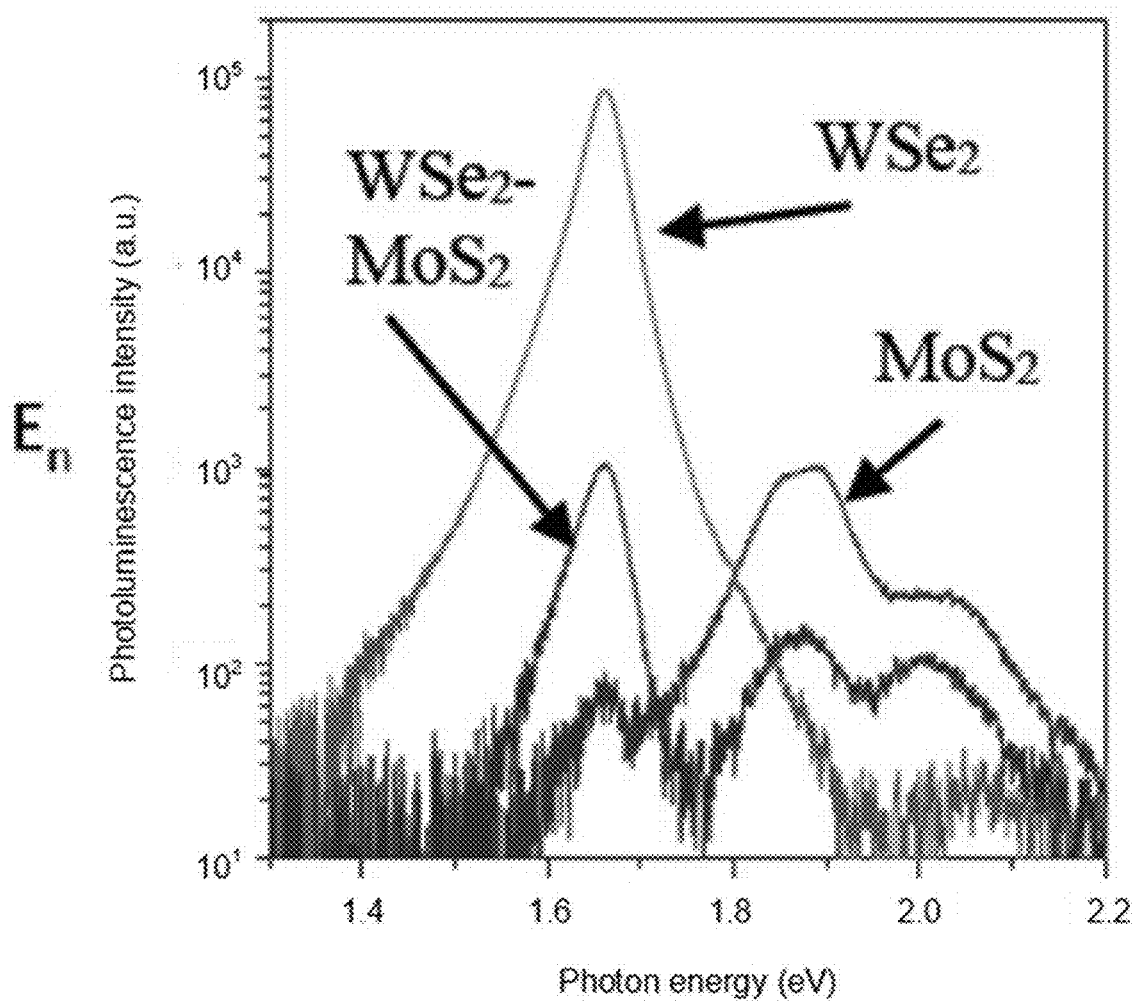
FIG. 3B is a photoluminescence (PL) spectrum of the electro-optical converter.
Figure 3C:
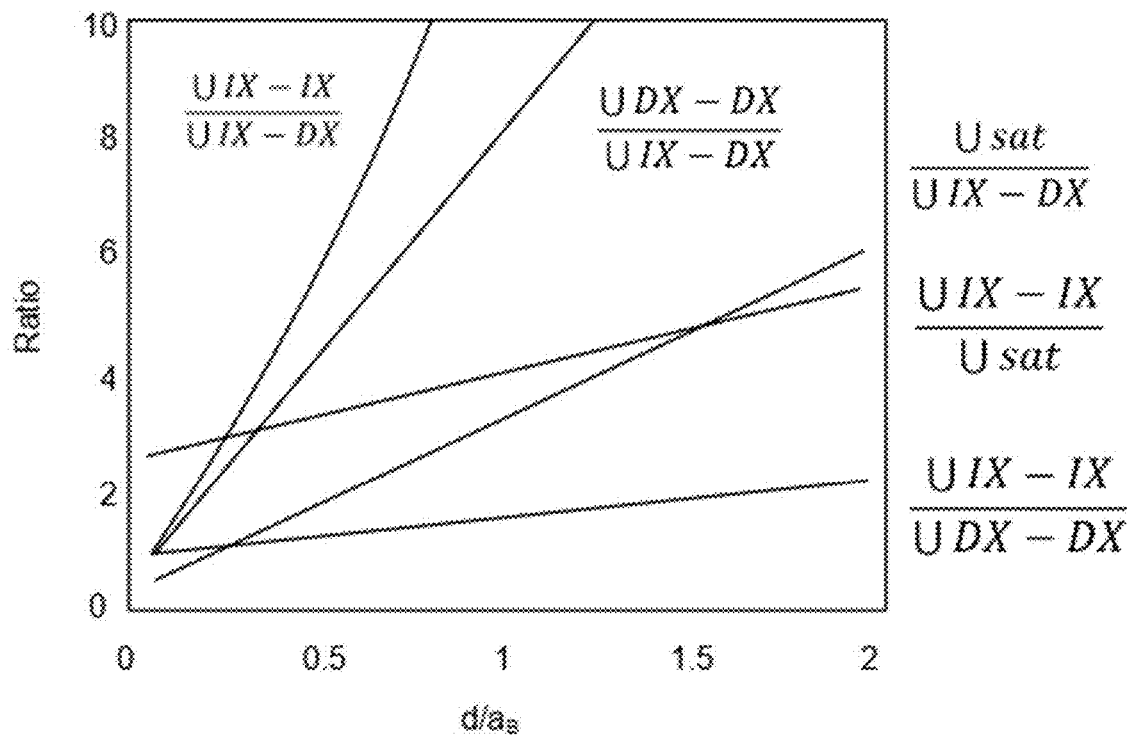
FIG. 3C is a graph showing dipolariton mutual interactions can be tuned by the dielectric environment.

In some embodiments, a heterogenous TMD layer is used as the semiconducting layer 114. Heterogeneous TMD bi-layers are composed of two different TMD materials; FIG. 3A shows an example for $MoS_2$ and $WSe_2$. The heterogeneity enables one to mitigate darkening of the excitonic dipole transition in multilayer TMDs due to the indirect band gap formation. The layers are coupled due to van der Waals attraction at the interlayer distance d~0.6 nm. Due to the difference in the band energies, negatively charged electrons (e) and positively changed holes (h) spatially separate thus, forming indirect (charge-transfer) excitons, IX, with e located in $MoS_2$ and h located in $WSe_2$ along with direct excitons, DX, where both e and h are located in the same $WSe_2$ layer, FIG. 3A. The fraction of IX and DX in the bi-layer, and the free carrier density, can be tuned by applying the gate voltage similar to that in coupled quantum wells. The respective PL spectra that confirm coupling of the exciton modes with light in a TMD bi-layer are shown in FIG. 3B. It was experimentally shown and then, theoretically understood by Kolmakov and co-authors that charge-transfer excitons can form dipolaritons, which are three-way quantum superposition of cavity photons, IX and DX. Due to charge separation in the IX component, dipolaritons are extremely sensitive to electric fields, as explained in Sec. "Electric switching mechanism" below. The dipolariton mutual interactions U (and thus, their dynamics) can be tuned by the dielectric environment, which modifies the exciton Bohr radius $a_B$, as is seen in FIG. 3C.

Effects of quantum coherence at 4 K. Thanks to their small effective mass ($\sim 10^{-6}$ of the atomic mass) cavity polaritons undergo the Bose-Einstein condensation and transit to a highly-coherent superfluid state at temperatures<10 K. In this superfluid state, light and charges propagate virtually without dissipation. The polariton superfluidity is similar to superconductivity, which is the superfluidity of Cooper pairs. Polariton superfluidity at 4 K will enable us to reduce the heat released in the cryogenic system. Superfluid polaritons propagate with the speed of ~5% of the speed of light in vacuum that results in a low latency<0.3 ns of the device.

Electric Switching Mechanism

Control of the polariton propagation by an electric current is one aspect of this disclosure. The mechanisms resulting in the polariton drag by electric current are reviewed in the following section.

Select parameters of one embodiment of the disclosed system are the following: The cryogenic operational temperature, approximately −452° F. (4 K above the absolute zero), high bandwidth (14 Gigabit of information per second), low latency (<0.3 ns) and low energy consumption per bit (less than 7 attoJoule per bit). The parameters match the key requirements for quantum computers and for low-temperature computer electronics.

Figure 4A:
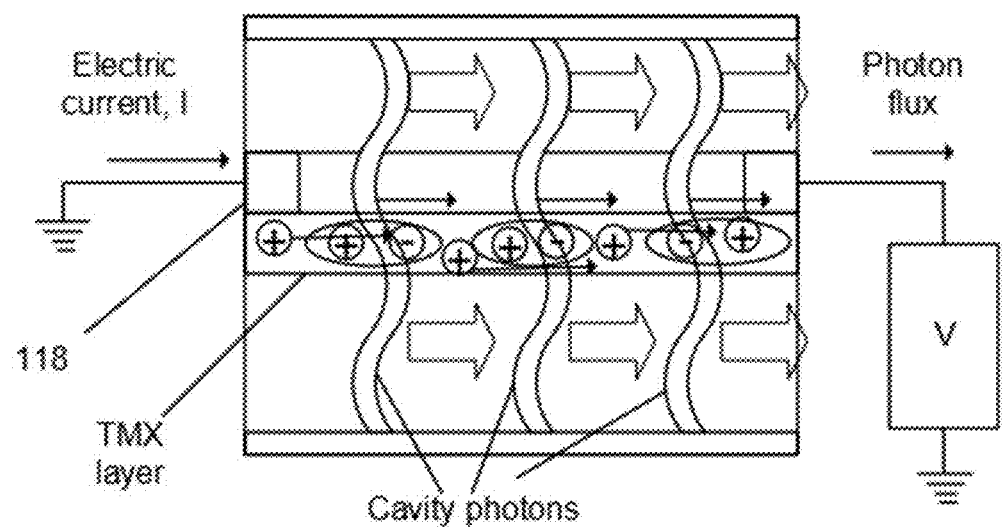
FIG. 4A illustrates a single-layer TMX, wherein the exciton component of polaritons is entrained by the electric current running in the same or neighboring layer.

In single-layer TMX, the exciton component of polaritons is entrained by the electric current running in the same or neighboring layer. In effect, the polariton are dragged in the direction of the current that results in the induced polariton flux $$J = \gamma_p E \qquad (2)$$

as shown in FIG. 4A. Here, E is the driving electric field induced by the applied electric voltage V and $\gamma_p \approx 2.5 \times 10^{16}$ $(Vs)^{-1}$ is the drag coefficient at T=4 K. The drag in Eq. (2) is a trigger in a cryogenic optical electric switch at T≥3 K.

Figure 4B:
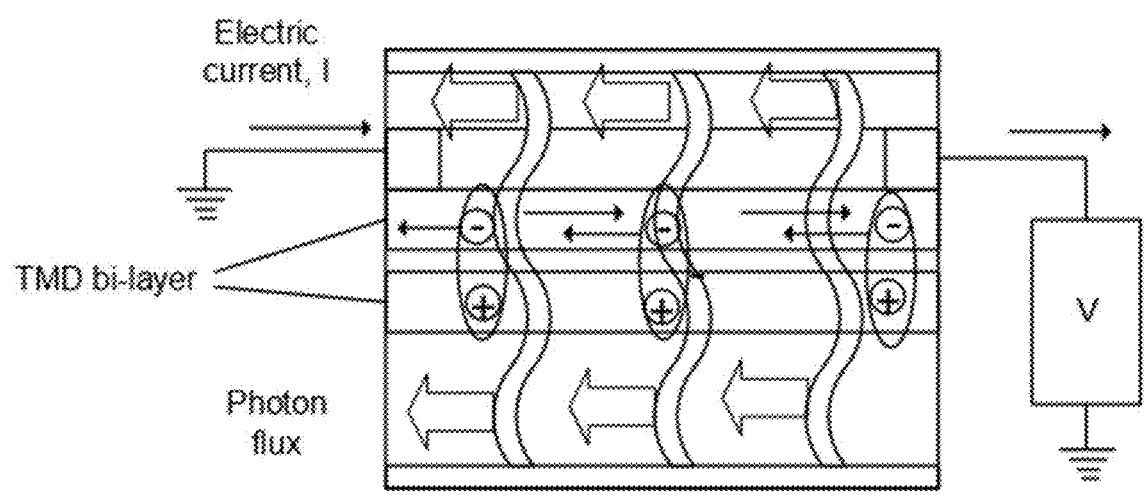
FIG. 4B illustrates a heterogeneous TMD ($WSe_2/MoS_2$) bi-layer, wherein the driving voltage is applied to $MoS_2$ layer and thus, creates the electric force on electrons e in the indirect exciton (IX) component.

In a heterogeneous TMD ($WSe_2$/$MoS_2$) bi-layer, the driving voltage is applied to $MoS_2$ layer and thus, creates the electric force on electrons e in the indirect exciton (IX) component, see FIG. 4B. Since IX and cavity photons are coupled in dipolaritons, the respective electric force acting on the photons is $$F_{photon} = |C_k|^2 |Y_k|^2 eE \qquad (3)$$

where $|Y_k|^2 = 1 - |C_k|^2 - |X_k|^2$ is the IX fraction and e is the electron charge. Application of the gate voltage changes the IX and DX fractions, $|Y_k|^2$ and $|X_k|^2$ and thus, can be used for fine tuning of the electric drag force on photons in Eq. (3).

Also, delocalized electrons in n-doped $MoS_2$ bind to DX thus, forming charged excitons—trions ($X^-$). The electric field in the TMX layer directly drags the trions thus providing an additional electric force improving the switching mechanism.

Methodology

This disclosure provides a linearly-shaped electrically controlled optical switch based on the studies of propagation of an exciton-polariton condensate in a patterned optical microcavity with an embedded quantum well. The polaritons are driven by a time-dependent drag force owing to the interaction of excitons in a quantum well and the electric current running in a neighboring quantum well. Polaritons are generated due to laser pumping with Gaussian distribution of power in the beam.

The dynamics of the polariton condensate was captured via the non-equilibrium Gross-Pitaevskii equation for the condensate wave function $\Psi(r,t)$ $$i\hbar \frac{\partial \Psi(r,t)}{\partial t} = \qquad (4)$$
$$-\frac{\hbar^2}{2m} \Delta \Psi(r,t) + U(r,t)\Psi(r,t) + g\Psi(r,t)|\Psi(r,t)|^2 - i\frac{\hbar}{2\tau_0}\Psi(r,t) + iP(r,t)$$

where m is the polariton mass, r=(x,y) is a two-dimensional vector in the plane of the microcavity and time t, g is the polariton-polariton interaction strength, $\tau_0$ is the polariton lifetime, and the source terms P(r,t) describes incoherent laser pumping of the polariton reservoir.

The effective potential for the polaritons $$U(r,t) = U_{conf}(r) + U_w(r) + U_{drag}(r,t) \qquad (5)$$

is the sum of the confining potential owing to microcavity patterning $U_{conf}(r)$, a linear potential corresponding to a constant accelerating force in a wedge-shaped microcavity $U_w(r)$, and a time-dependent drag potential $U_{drag}(r,t)$ caused by the driving electric current.

Figure 5:
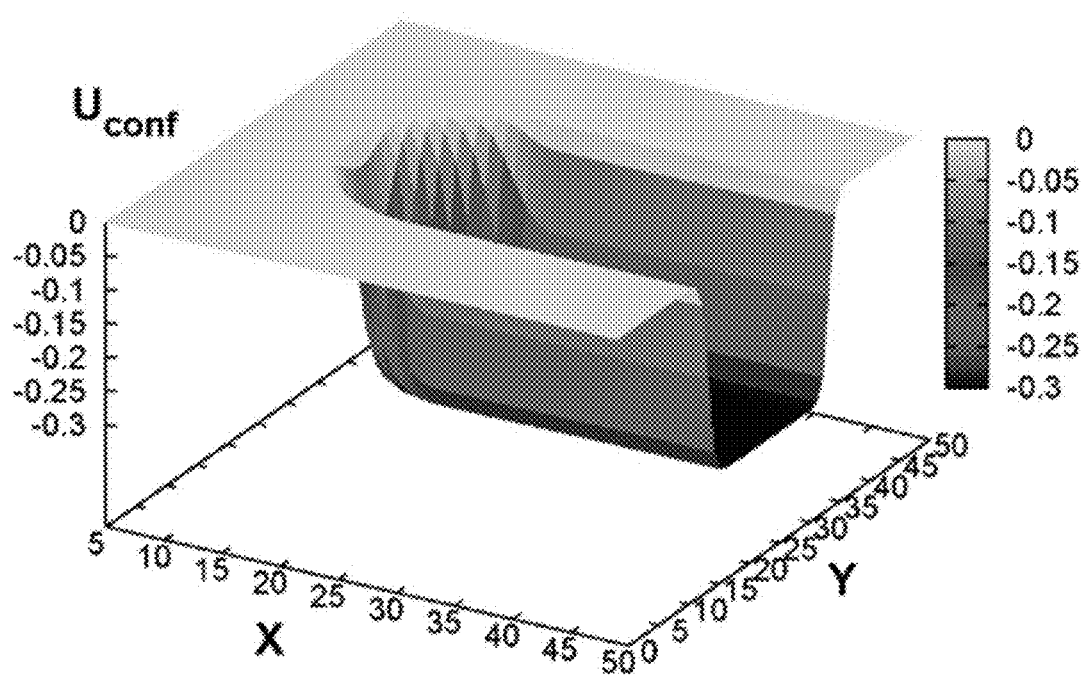
FIG. 5 is a graph depicting channel potential $U_{conf}(r)$ when confining the polariton flow in transverse y direction.

The channel potential $U_{conf}(r)$ confining the polariton flow in transverse y direction can be applied, for example, by patterning one of the mirrors of the cavity or by the electrostatic potential. Another way is to apply $U_{conf}(r)$ is electric trapping in the transverse direction y. The specific type of the confining potential is not essential for the disclosed technology. In the simulations, the respective linear channel was modeled by the potential energy profile shown in FIG. 5.

The average force acting upon a polariton wave packet in a wedge-shaped micro-cavity is $F(r)=-\nabla E_C(r)$, where $E_C(r)$ is the energy of the polariton band taken at the in-plane wavevector of the polariton k=0. For the wedge-like microcavity considered in this paper, the energy $E_C(r)$ is a linear function of the spatial coordinate thus, the force is coordinate-independent. The corresponding potential is $$U_w(r) = \begin{cases} F_x^{(1)}(x - x_c), & \text{if } x < x_{max} \\ F_x^{(1)}(x_{max} - x_c) - F_x^{(2)}(x - x_{max}), & \text{if } x > x_{max} \end{cases} \qquad (6)$$

where the force is applied in x-direction, $x_c$ is the pumping center coordinate, $x_{max}$ is a coordinate of the maximum of the wedge potential. The potential $U_w(r)$ is sketched in FIG. 6.

The potential that represents the drag force caused by the applied electric drive in x-direction is taken equal $$U_{drag}(r,t) = -F_{drag}(t)(x - x_c) \qquad (7)$$

Assuming that the electric drag force is directed along the x-axis, the potential (7) does not depend on the y-coordinate. The drag force exerted on polaritons well is estimated in the $\tau$-approximation as $$F_{drag}(t) = \frac{\langle p \rangle}{\tau_p} = \frac{m\gamma_p E(t)}{n_n \tau_p} \qquad (8)$$

where $\langle p \rangle$ is the average gain of the linear momentum of polaritons owing to the drag, $\tau_p$ is the polariton momentum relaxation time, E(t) is a time-dependent electric field applied in the plane of the quantum well with free electrons, $$n_n = \frac{3\zeta(3)s(k_B T)^3}{2\pi\hbar^2 c_s^4 m} \qquad (9)$$

is the density of the normal component in a polariton superfluid, $\zeta(3)\approx1.202$ is the Riemann zeta function, $s=4$ is the spin degeneracy factor, $k_B$ is the Boltzmann constant, T is temperature, and $c_s=\sqrt{gn/m}$ is the sound velocity in the spectrum of collective excitations in the polaritonic system, and n is the polariton condensate density. The polariton effective mass is $$m = 2\left(m_{ex}^{-1} + \frac{cL_C}{\sqrt{\varepsilon\pi\hbar}}\right)^{-1} \quad (10)$$

where $m_{ex}$ is the exciton effective mass, $L_C$ is the length of the microcavity (the distance between the DBRs), $\varepsilon$ is the dielectric constant of the microcavity, and c is the speed of light in vacuum. In the simulations for a GaAs-based microcavity, set $\varepsilon=13$ and $m_{ex}=m_e+m_h=0.24m_0$, where $m_e=0.07m_0$ and $m_h=0.17m_0$ are the electron and hole effective masses, respectively, and $m_0$ is the free electron mass. Consider the case of zero detuning where the cavity photons and the excitons are in the resonance at $k=0$. In this case, the length of the microcavity is $$L_C = \frac{\pi\hbar c}{\sqrt{\varepsilon}(E_{band} - E_{binding})} \quad (11)$$

where $E_{band}$ is the band-gap energy and $E_{binding}$ is the binding energy of a 2D exciton. In GaAs/AlGaAs quantum wells set $E_{band}=1.51$ eV and $E_{binding}=7$ meV. For dipolar excitons in GaAs/AlGaAs coupled quantum wells, the energy of the recombination peak is $\hbar\omega=1.61$ eV.

The polariton-polariton interaction strength is $$g = \frac{3e^2 a_B}{8\pi\varepsilon_0\varepsilon} \quad (12)$$

where $a_B=2\pi\varepsilon_0\varepsilon\hbar^2/m_r e^2$ is the two-dimensional Bohr radius of the exciton and $m_r$ is the exciton reduced mass. For GaAs/AlGaAs quantum wells set $m_r=m_e m_h/(m_e+m_h)$. The polariton lifetime was taken in the simulations as $\tau_0=123$ picoseconds (ps) as a representative value.

By taking the polariton condensate density $n=10^{14}$ m$^{-2}$, the separation between exciton containing layers $D=17.5$ nm, the drag coefficient $\gamma=6\times10^{16}$ (Vs)$^{-1}$ and the relaxation time $\tau_p=6\times10^{-11}$ s as representative parameters for temperature $T=10$ K from eqs. (8)-(11) and (12) one obtains $n_n=2.6\times10^{13}$ m$^{-2}$ and the drag force $F_{drag}=0.17$-$8.3$ meV/mm for the working range of electric fields $E=0.01$-$0.5$ V/mm. The case where the response of the system to the drag is linear and, was considered and hence, eq. (4) is applicable.

Numerical Units and Parameters: Simulations were made in numerical units for convenience. This enables us to scale the results of the simulations to other materials. if needed. The numerical units and relevant parameters are summarized in Table 1.

TABLE 1

Numerical units and relevant simulation parameters

| Parameter | Numerical value | Value |
|---|---|---|
| Length | 1 numerical unit (n.u.) of length, $\Delta x$ | 0.15 µm |
| Time | 1 numerical unit (n.u.) of time $\Delta t$ | 39 fs |
| Polariton density | 1 numerical unit (n.u.) of 2D density, $(\Delta x)^{-2}$ | 44.4 µm$^{-2}$ |
| Polariton flux | 1 numerical unit (n.u.) of 2D flux, $J_0$ | $2.56 \times 10^{-2}$ particles/fs |
| Wedge force at $x < x_c$ | $F_x^{(1)}$ | variable, 6.5 meV/mm if another value is not given. |
| Wedge force at $x_c < x$ | $F_x^{(2)}$ | variable, 6.5 meV/mm if another value is not given. |
| Distance between center of pumping spot and maximum of wedge potential | $x_{max} - x_c$ | 150 µm |
| Full width at half maximum of the pumping laser spot | fwhm | 16.7 µm |
| Pulsed drag force | $F_{drag}$ | variable, 13-26 meV/mm |
| Time duration of pulsed drag force | $\tau$ | variable, 100-200 ps |
| Simulation box in (x, y) plane | $L_x \times L_y$ | $6000\Delta x \times 1500\Delta x$ |
| x-coordinate of the cross-section, at which the transmitted polariton flux is determined | $x_d$ | $500\Delta x = 75$ µm to the right from $x_{max}$ |

Figure 7:
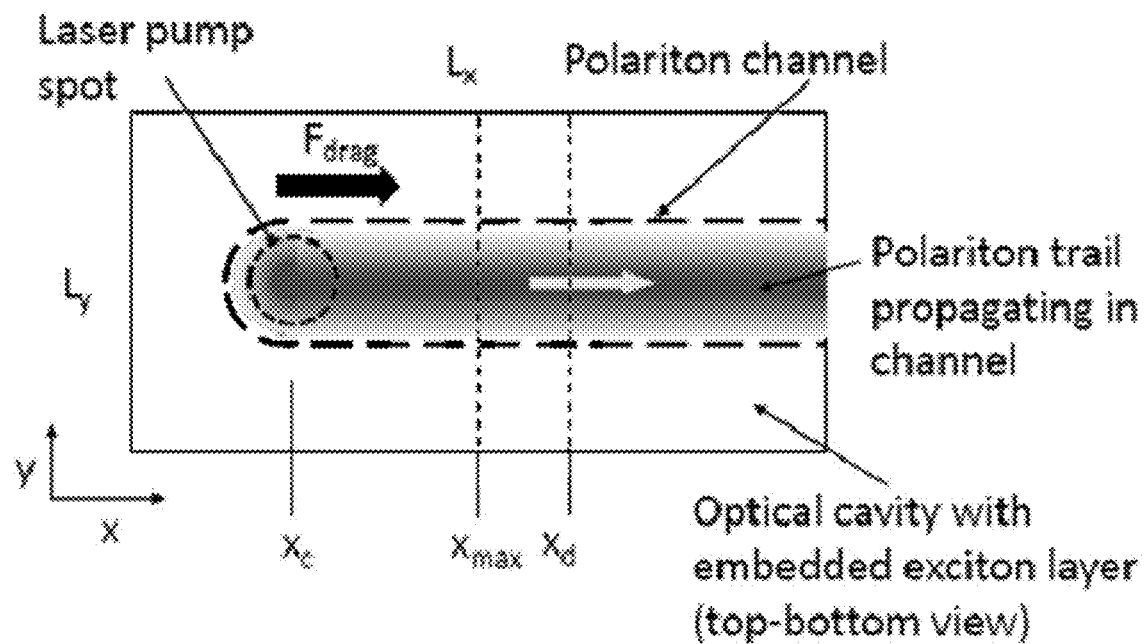
FIG. 7 (top view) is a schematic of an optical cavity that was used in simulations using the values depicted in Table 1.

The layout of the cavity is shown in FIG. 7. Equation (4) was numerically integrated on a graphical processing unit (GPU) accelerator with the 4th-order Runge-Kutta method in time with the numerical time step $h=10^{-2}$ $\Delta t$ and the 4th-order accuracy in the spatial Laplace operator in the (x,y) plane on the spatial grid with spacing $\Delta x$.

Simulations Results

The results of detailed numerical studies are placed in an Appendix, which is found in U.S. Patent Application 63/045,094, the content of which is hereby incorporated by reference.

Figure 8A:
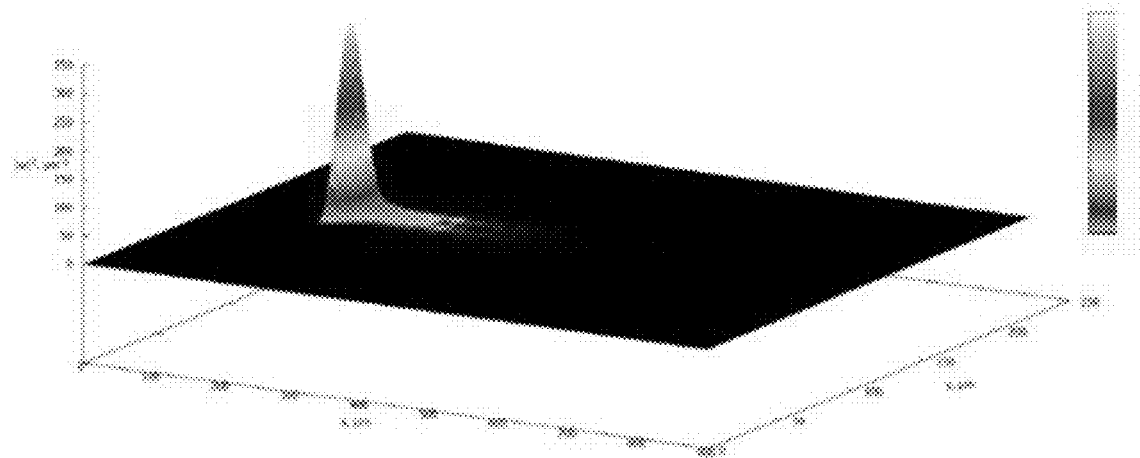
FIG. 8A (top perspective view) and FIG. 8B (top view) is a graph depicting polariton density in the cavity after a pulsed drag force is applied.
Figure 8B:
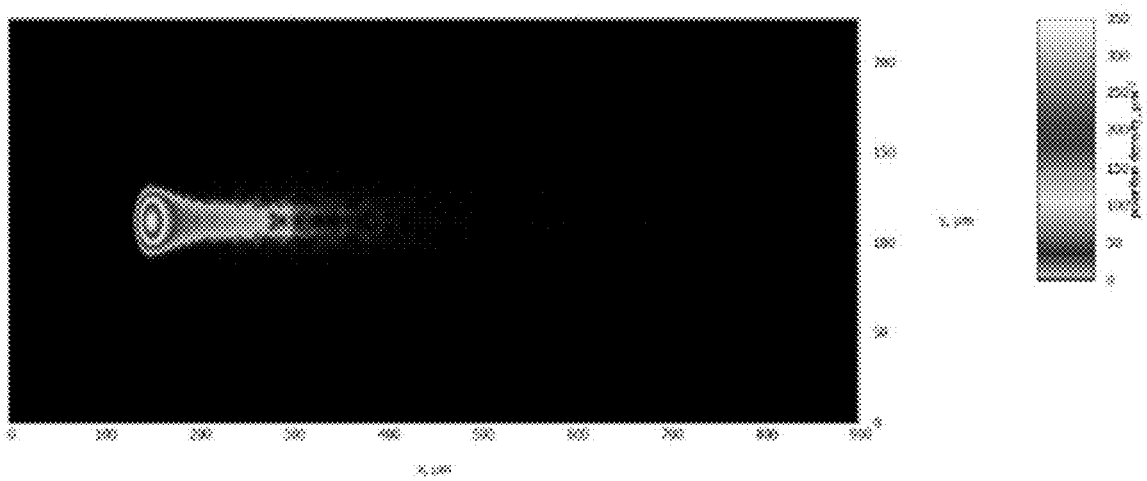

FIG. 8A and FIG. 8B shows the polariton density in the cavity after a pulsed drag force, $F_{drag}$ is applied. It is seen that the polariton density is high at the pumping spot and gradually decreases in the channel with distance from spot.

The output signal in the EOC device as polaritons crossing the $x=x_d$ cross-section positioned 75 µm to the right from $x_{max}$ in the (x,y) plane, as shown in FIG. 7. The signal is characterized by the total flux of polaritons J through at $x=x_d$ integrated along the cross-section of the channel, as a function of time, $$J = \int dy j_x \,|_{x=x_d} \tag{13}$$

$$j_x = \frac{\hbar}{2im}\left(\Psi^* \frac{\partial \Psi}{\partial x} - c.c\right)$$

where the polariton wave function $\Psi$ was calculated by numerically integrating eq. (4), and c.c. denotes the complex conjugate.

Initial Relaxation

Figure 6:
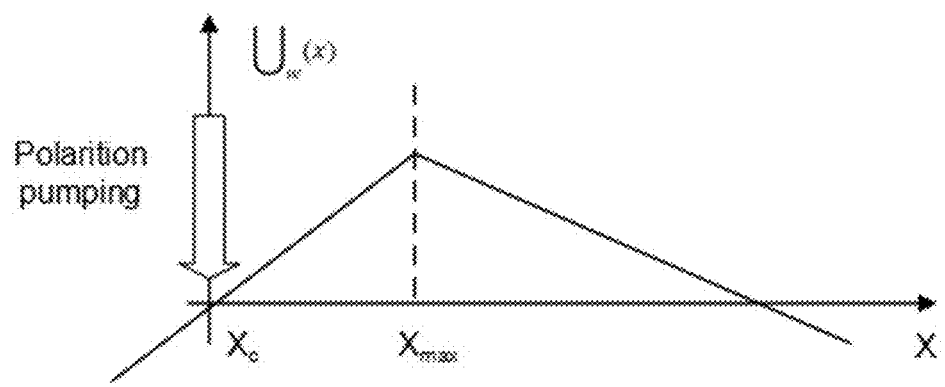
FIG. 6 is a graph of the potential $U_w(r)$ wherein force is applied in an x-direction.
Figure 9:
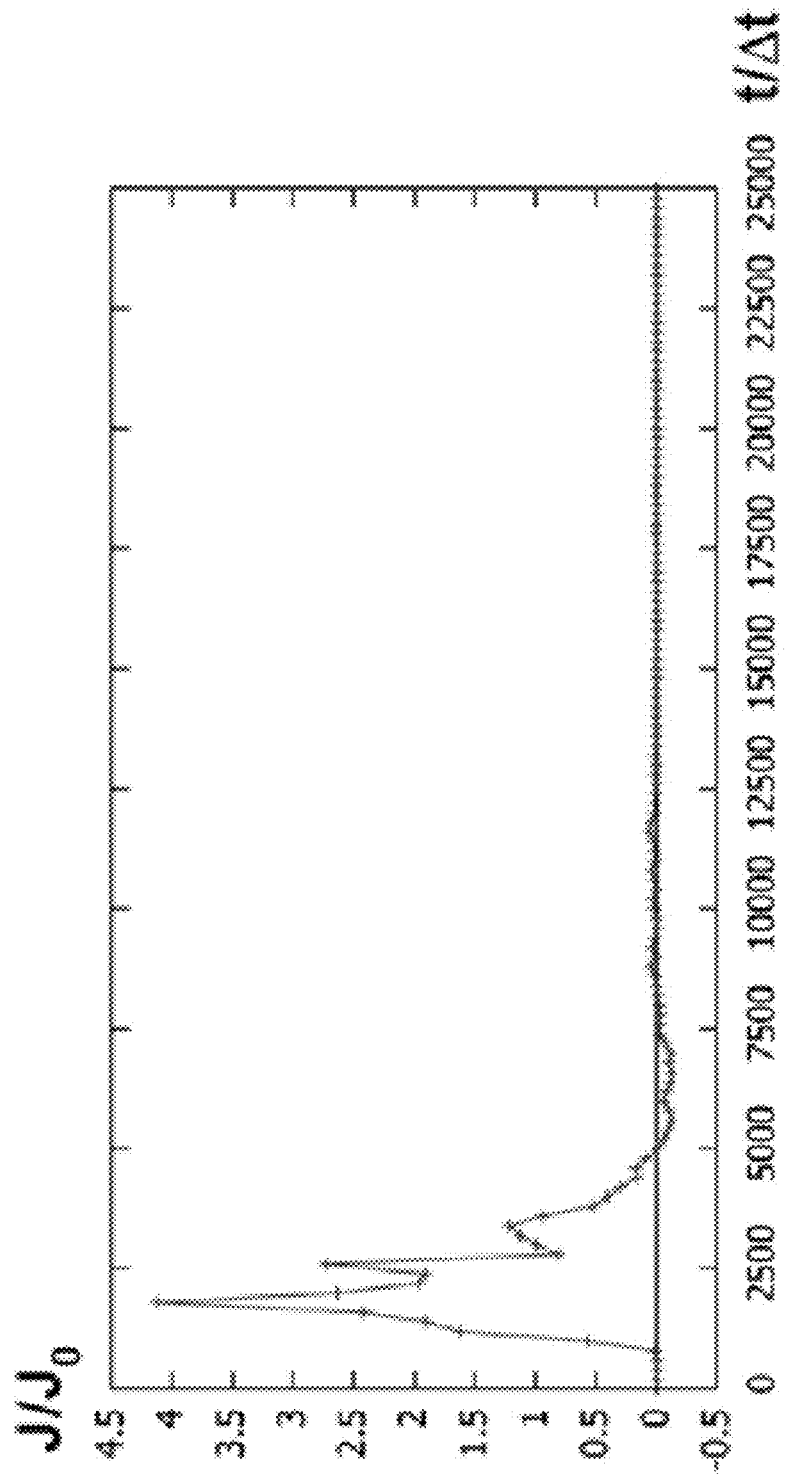
FIG. 9 is a graph depicting polariton flux J at the cross-section $x=x_d$, as a function of time, when no drag force is applied to the system.

We first calculated the polariton flux J at the cross-section $x=x_d$, as a function of time, when no drag force is applied to the system, $F_{drag}=0$. The results are shown in FIG. 9. The peak in the output signal at $t \approx 2.5 \times 10^4$ $\Delta t$ is caused by the initial relaxation in the polariton system. After the initial relaxation is over, $t > 1.2 \times 10^4$ $\Delta t$ the flux J tends to zero due to the locking effect of the wedge potential $U_w$ acting on the polaritons. (The respective potential is shown in FIG. 6.)

Single Electric Pulse

Figure 10:
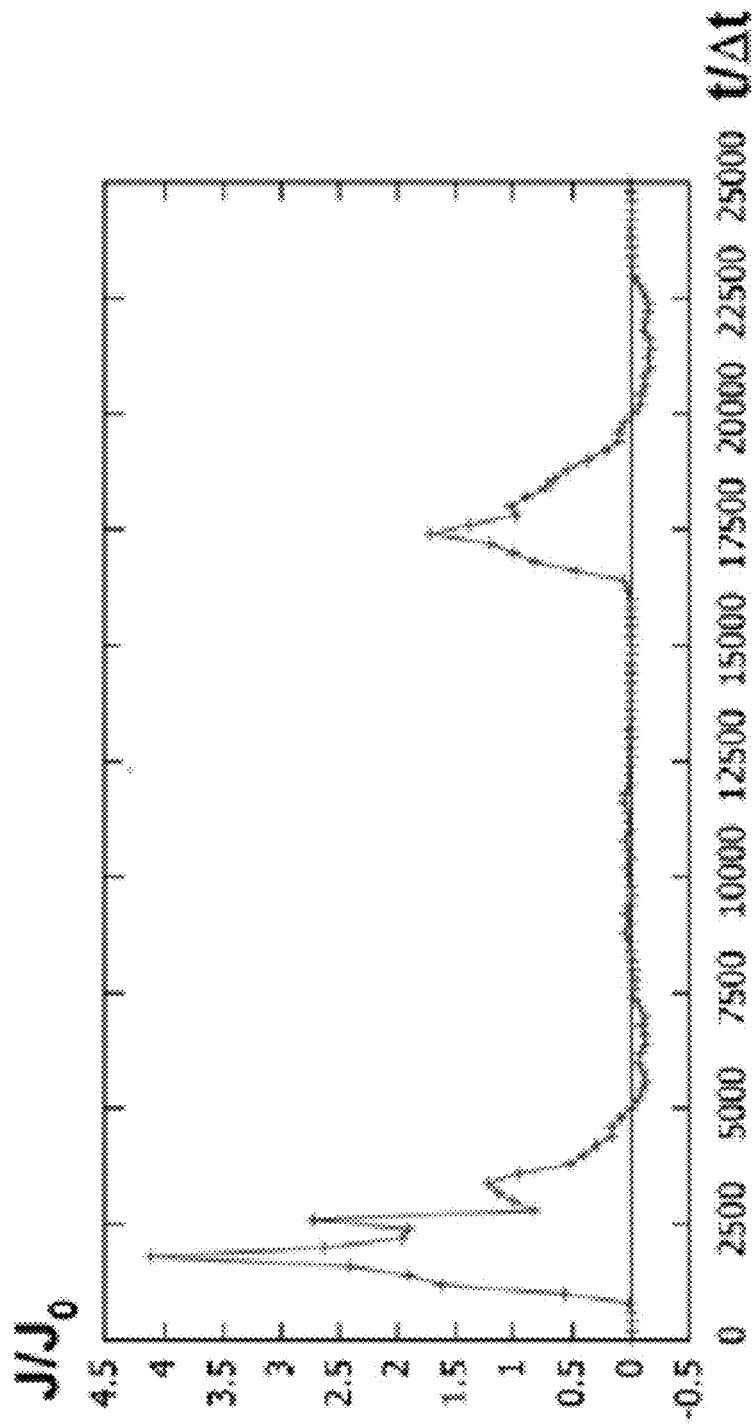
FIG. 10 is a graph showing polariton flux, J, at a cross-section $x=x_d$, as a function of time, after a drag force $F_{drag}=13$ meV/mm with the time duration $\tau=2\times10^3$ $\Delta t$ was applied at $t=1.3\times10^4$ $\Delta t$.

Then, the effect of the electric pulsed drag, $F_{drag}$ on the polariton flux J was determined. FIG. 10 shows the polariton flux, J, after a pulsed drag force $F_{drag}=13$ meV/mm with the time duration $\tau = 2 \times 10^3$ $\Delta t$ was applied at $t=1.3 \times 10^4$ $\Delta t$. As a result of the pulsed drag, a polariton pulse formed at $x > x_{max}$. The pulse propagates in the channel and reaches the cross-section $x=x_d$ at $t \approx 1.7 \times 10^4$ $\Delta t$. Thus, it takes $\sim 4 \times 10^3$ $\Delta t$ for the pulse to propagate from the laser pump spot at $x=x_c$ to the detection position at $x=x_d$.

Multiple Electric Pulses

Further, to understand the response of the system if multiple electric pulses, $F_{drag}$, were applied, calculated the flux J was calculated in the case where the drag force encompassed two pulses.

Figure 11:
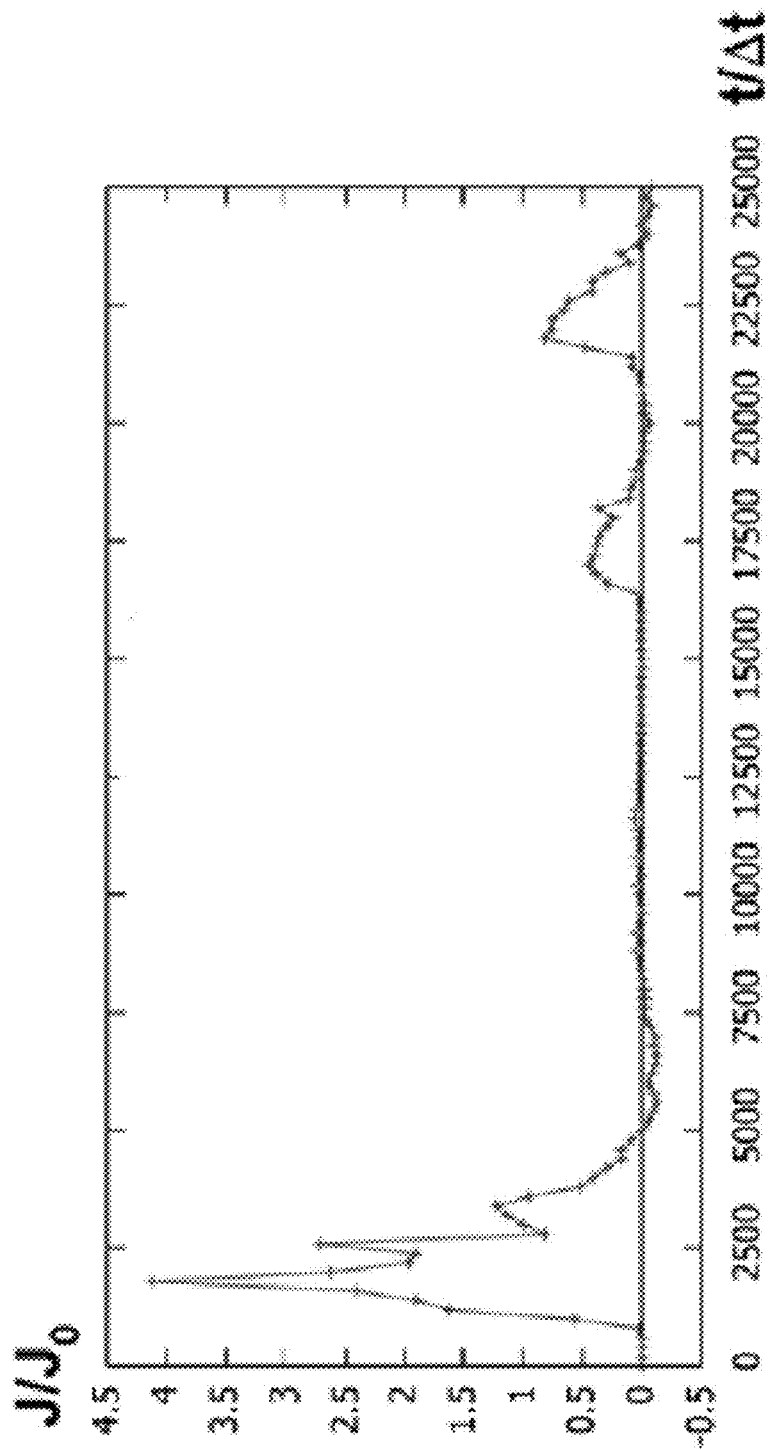
FIG. 11 is a graph showing the polariton flux, J, after two pulses of the pulsed drag force, with $F_{drag}=13$ meV/mm and the time duration $\tau=10^3$ $\Delta t$ each, were applied. The first pulse was applied at $t=1.5\times10^4$ $\Delta t$ and the second pulse was applied at $t=2.0\times10^4$ $\Delta t$.

The magnitude of both pulses was equal to $F_{drag}=13$ meV/mm, and the time duration was $\tau=10^3$ $\Delta t$. The first and second pulses were turned on at $t=1.5 \times 10^4$ $\Delta t$ and $t=2.0 \times 10^4$ $\Delta t$, respectively. The result of the simulation is shown in FIG. 11. It is seen in the figure that two polariton pulses formed and propagated in the channel. The first pulse in the pair reached the cross-section $x=x_d$ at $t \approx 1.7 \times 10^4$ $\Delta t$.

Figure 12:
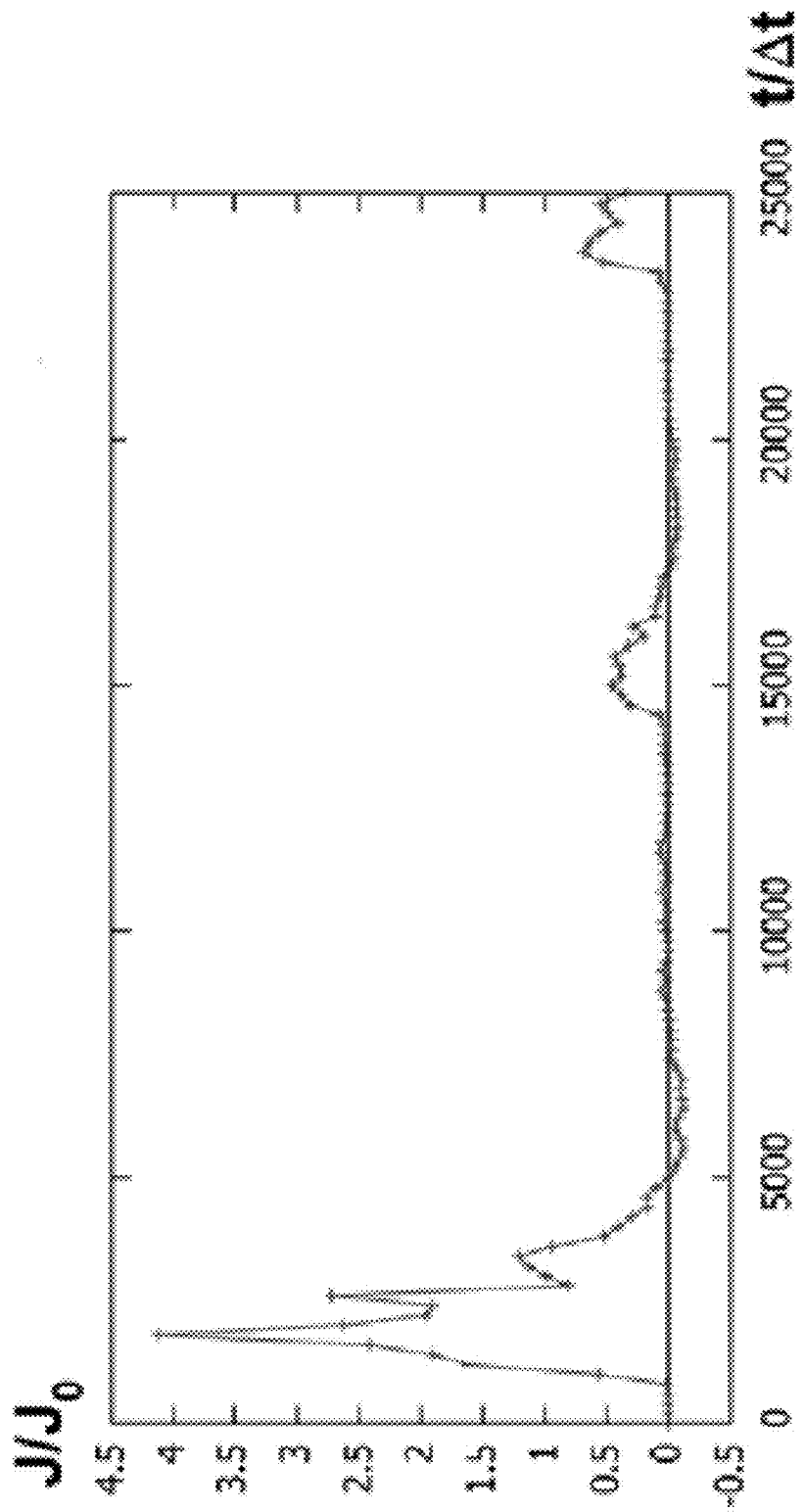
FIG. 12 is a graph showing the result of the simulation for the two pulses when the first pulse was applied at $t=1.3\times10^4$ $\Delta t$ and time between the drag pulses was $8.0\times10^3$ $\Delta t$.

If the time difference between the two drag force pulses was increased, the time between the two detected polariton pulses increased as well. The result of the simulation for the time between the drag pulses of $6 \times 10^3$ $\Delta t$ is shown in FIG. 12.

Figure 13:
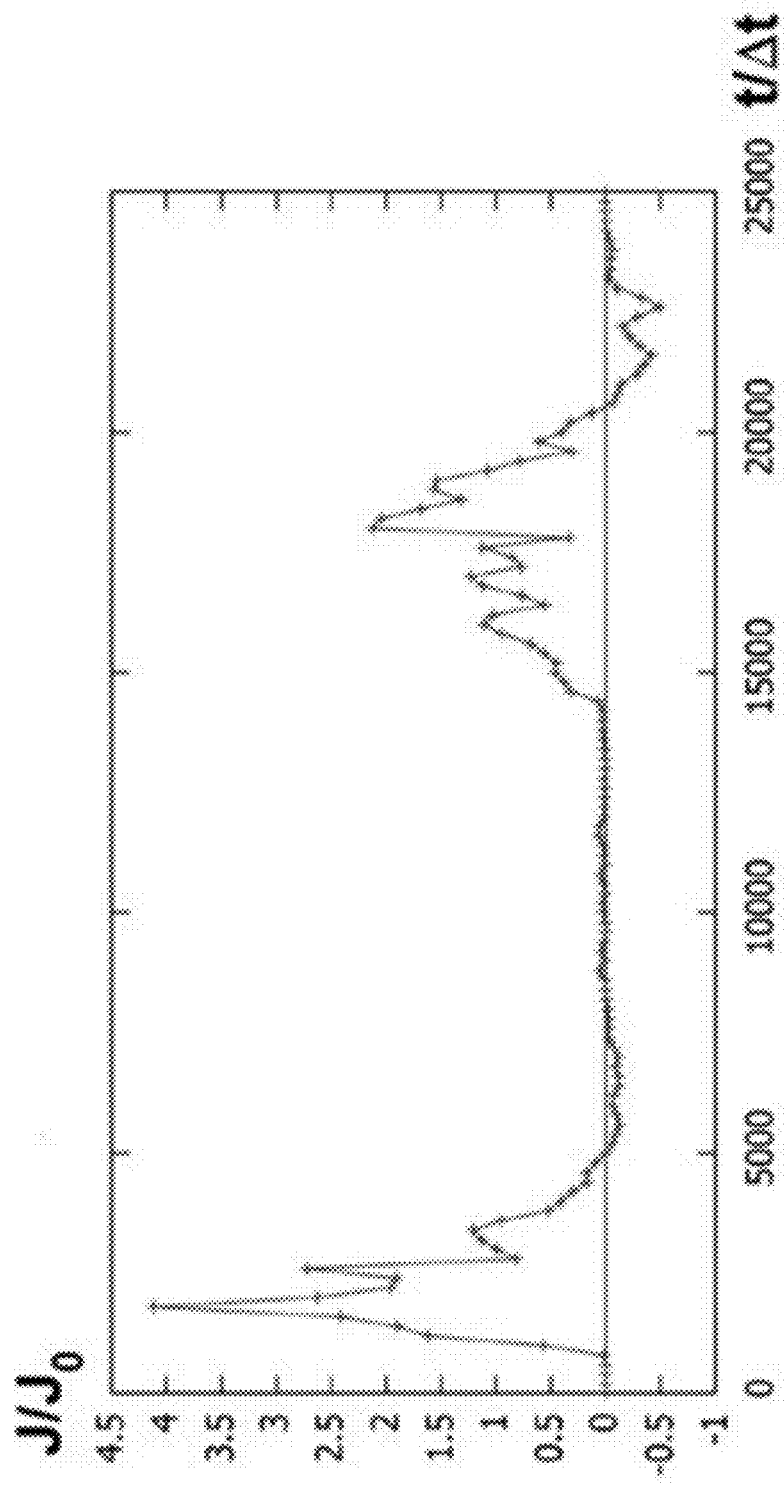
FIG. 13 is a graph showing an example for two overlapping polariton pulses for $\tau=10^3$ $\Delta t$ drag pulses separated by the time interval $10^3$ $\Delta t$.

If the time between the two drag pulses were smaller than $\approx 2 \times 10^3$ $\Delta t$, two polariton pulses overlapped and become indistinguishable. An example for two overlapping polariton pulses for $\tau=10^3$ $\Delta t$ drag pulses separated by the time interval $10^3$ $\Delta t$ is shown in FIG. 13.

Concluding Remarks

It was demonstrated that pulsed drag force generated by the applied pulsed voltage resulted in formation of the polariton pulses propagating in the channel and reaching the optical read-out area in the device. If multiple voltage pulses are applied then, multiple polariton pulses propagated in the system. Therefore, the system performs conversion of input electric signals into optical signals.

The low temperature environment provides the exciton stability in the semiconductor layer embedded into the optical microcavity. For example, for GaAs quantum well as a exciton containing layer, the working temperature are restricted by T~30 K. Above this temperature, the excitons in GaAs become thermodynamically unstable and the polaritons collapse.

However, application of emerging two-dimensional materials such as transition metal dichalcogenides and monochalcogenides enables one to mitigate this temperature limitations. For example, it is known that in these materials, polaritons remain stable up to the room temperature T=300 K (approx. 80° F.). Therefore, application of such materials permits one to significantly enlarge the temperature range and include room-temperature applications such as design EOC for high-speed optical data transmission lines including those listed in Sec. 1 "Significance of the Invention" above.

The detailed numerical analyses of the designed system with the variations of the parameters are placed in an Appendix which is found in U.S. Patent Application 63/045,094, the content of which is hereby incorporated by reference.

Figure 14:
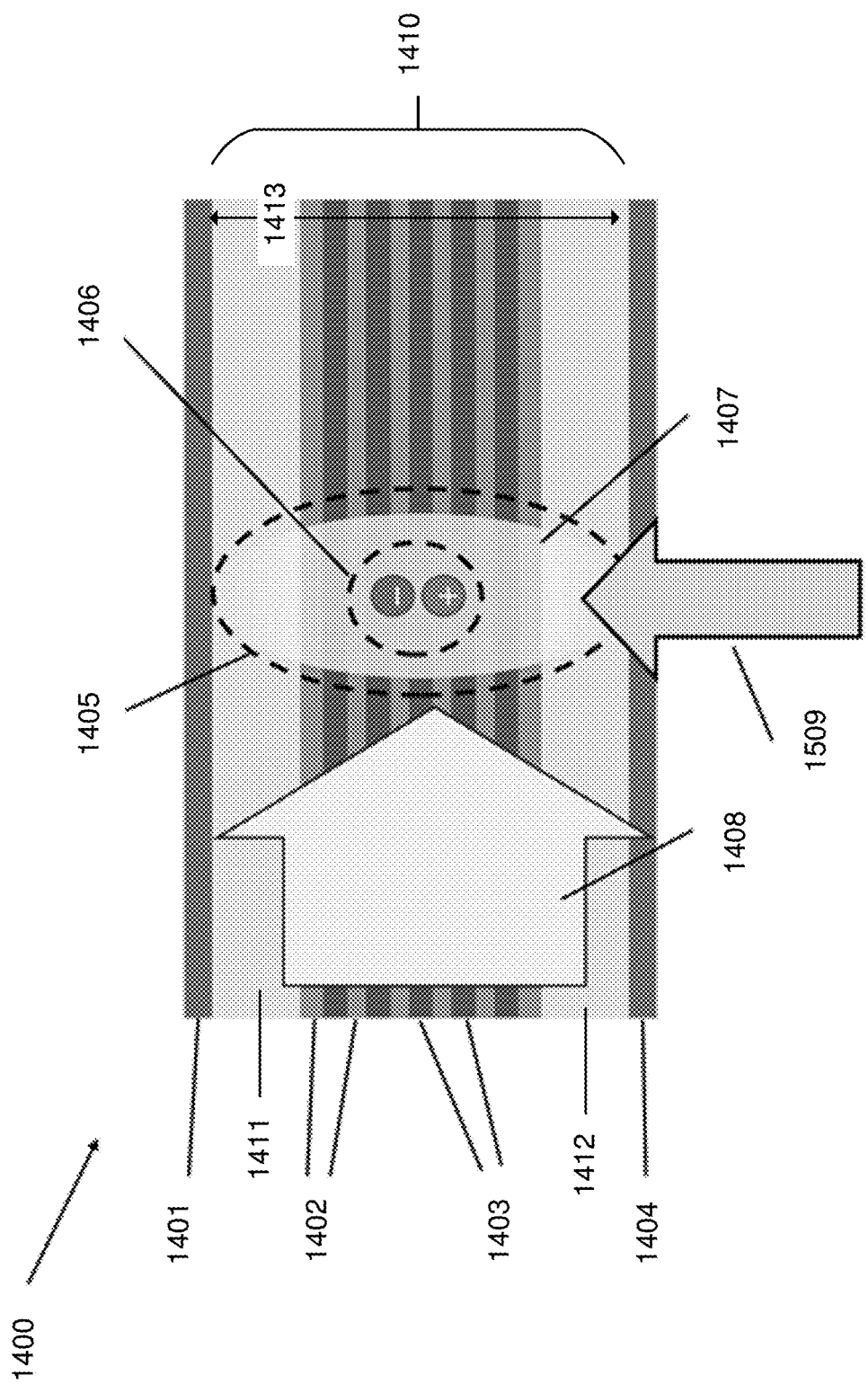
FIG. 14 is a schematic depiction of one device suitable for performing the disclosed method.

FIG. 14 depicts a device 1400 to encode quantum information into optical pulses. The input electrical terminal and output electrical terminal in the device 100 are replaced with an input optical terminal and an output optical terminal in the device 1400. The optical terminals may be optical pathways through either or both of first and second mirrors 1401, 1404 or may be the spaces 1411, 1412 as shown in FIG. 14.

The device 1400 comprises semiconducting layered structure 1410 comprised of a multiple semiconducting layers 1402 separated by dielectric layers 1403. The semiconducting layered structure 1410 is disposed between first and second mirrors, 1401 and 1404 respectively. The first and second mirrors 1401, 1404 may be made by, for example, depositing metal on $SiO_2$ substrates or can be fabricated as multi-layered dielectric mirrors (diffraction Bragg reflectors). Spaces 1411, 1412 between the semiconducting layered structure 1410 and first mirror 1401 and second mirror 1404 can be filled with air (for air-filled devices) or with transparent dielectric material such as $SiO_2$ (for monolithic devices), or any combination of those (for mixed geometry devices). The first mirror 1401 and the second mirror 1404 are separated by a gap 1413. The gap 1413 can be between 0.5 micrometer to 10 micrometers. The gap 1413 may comprise an optically transparent dielectric material such as air, $SiO_2$, or a combination thereof.

The semiconducting layered structure 1410 can be made of various semiconductor layers including gallium arsenide (GaAs), aluminum gallium arsenide (AlGaAs), zinc oxide (ZnO), perovskite semiconductors, or transition metal dichalcogenides such as molybdenum disulfide ($MoS_2$), molybdenum diselenide ($MoSe_2$), indium selenide ($In_2Se_3$) or other material. The semiconducting layers 1402 are separated by the dielectric layers 1403 which can be made of aluminum gallium arsenide (AlGaAs), hexagonal boron nitride (h-BN) or silicon dioxide ($SiO_2$).

Each semiconducting layer 1402 and each dielectric layers 1403 has a width from a nanometer to 500 hundred nanometers. The semiconducting layered structure 1410 has from one to thirty layers. Multiple layers in the semiconducting layered structure 1410 increase the interaction of charges with photons in the device 1400 since the probability to create an exciton by the photon in a cavity is proportional to the number of layers.

Figure 15:
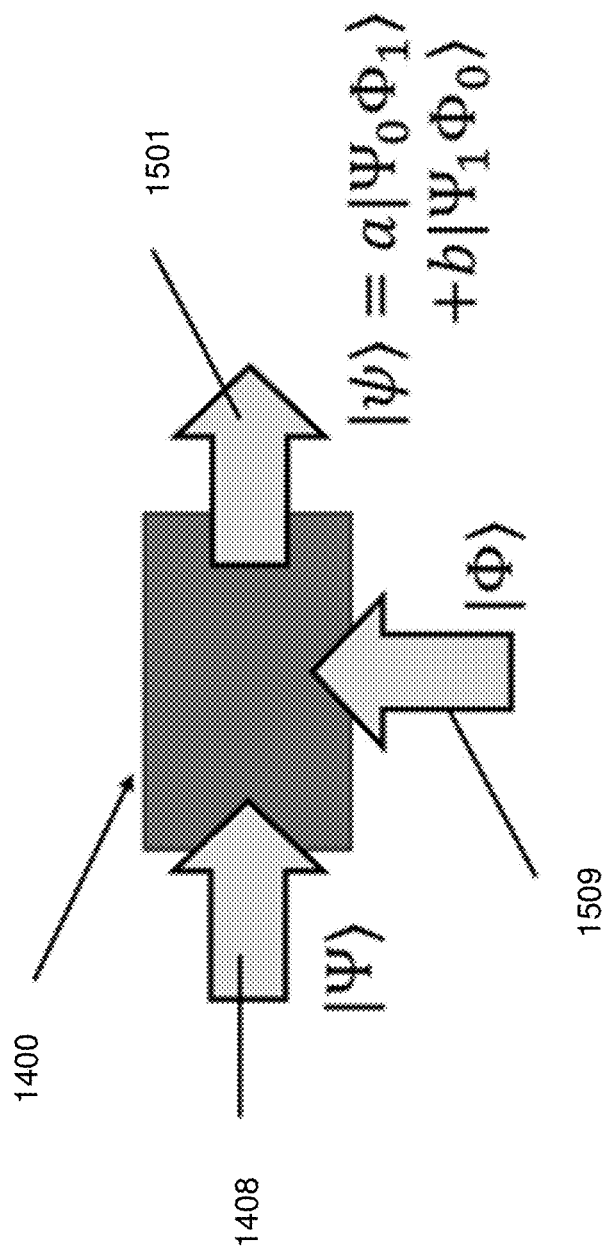
FIG. 15 is a schematic depiction of a single photon or multiple photons penetrate the device.

Referring to FIG. 15, a single photon or multiple photons 1509 penetrate the device via the second mirror 1404. The photons can also penetrate the device 1400 via the first mirror 1401. The single photon can by generated by a standard single-photon source. Multiple photons can be generated by a photon pair source or multiple photon source. The standard sources available on the market can be used. The first mirror 1401 and the second mirror 1404 form an optical cavity that traps photons inside the device 1400, to increase the photon-semiconducting layered structure interaction. The photons in the optical cavity create one or multiple excitons 1406 (see FIG. 14) in the semiconducting layered structure 1410. Only one exciton 1406 is shown in the device 1400 in FIG. 14 for the sake of the clarity of the picture however, multiple excitons can be present. The excitons 1406 are formed by negatively charged electrons and positively charged holes located in the semiconducting layers 1402. The excitons 1406 are bound due to the Coulomb's electric attraction between electrons and holes. The excitons 1406 and trapped photons 1407 are trapped in the optical cavity to form exciton polaritons 1405 which is a quantum superposition of the excitons 1406 and trapped photons 1407.

Microwave radiation 1408 enters the device 1400 either via an opening between the first mirror 1401 and the second mirror 1404 or through one of the first mirror 1401 or second mirror 1404 (i.e. microwave radiation 1408 enters at the input optical terminal). The microwave radiation 1408 has a frequency from 1 Gigahertz to 20 Gigahertz. Sources of the microwave radiation 1408 can be cryogenic or ambient-temperature qubits, or any other sources including antennas, specialized microwave radiation emitters, microwave radiation reflected from other objects, and so on. The device 1400 can be placed into a metal cavity to increase the interaction of the microwave radiation 1408 with the exciton polaritons 1405, or it can be installed in free space. The microwave radiation 1408 interacts with the exciton polaritons 1405 due to electromagnetic interaction of an electric field in the microwave radiation 1408 with electric charges in the excitons 1406. The trapped photons 1407 leave the device 1400 via the first mirror 1401 or the second mirror 1404 (i.e. through the output optical terminal). Photons that leave the device 1400 encode information about amplitude and phase of the microwave radiation 1408.

Referring again to FIG. 15, the microwave radiation 1408 entering the device 1400 is described by a quantum-mechanical wave function denoted as $|\Psi\rangle$. The quantum-mechanical wave function $|\Psi\rangle$ can contain information in various ways. For example, if the information is contained as time bins, the quantum-mechanical state of the microwave radiation 1408 can be described by the wave function $|\Psi_0\rangle$ if there is no quantum of the microwave radiation in the given time bin; or be described by the wave function $|\Psi_1\rangle$ if there is a quantum of the microwave radiation in the given time bin. If the information is contained in the microwave radiation polarization, then the wave function $|\Psi_0\rangle$ can describe the state of the vertical polarization and the wave function $|\Psi_1\rangle$ can describe the state of the horizontal polarization. The single or multiple photons 1509 penetrating the device 1400 via one of the first mirror 1401 or the second mirror 1404 are described by a quantum-mechanical wave function $|\Phi\rangle$. Similar to the microwave radiation 1408, for photons, if the information is contained as time bins, $|\Phi_0\rangle$ describes the state where there is no photons in the time bin and $|\Phi_1\rangle$ describes the state where there is a given number of photons in the time bin. The number of photons in the time bins can vary from one to one hundred. If the information is encoded into the photon polarization, the wave function $|\Phi_0\rangle$ can describe the state of the vertical polarization and the wave function $|\Phi_1\rangle$ can describe the state of the horizontal polarization. The interaction of the microwave radiation 1408 and the exciton polariton 1405 is described by the Hamiltonian operator, $$\hat{H} = \gamma \hat{c} \hat{d}_p \hat{d}_{p'}^+ + h.c. \quad (14)$$

where $\gamma$ is a rate of interaction characterizing microwave radiation-exciton polariton interaction strength, $\hat{c}$ is an annihilation operator of a quantum of the microwave radiation 1408, $\hat{d}_p$ is an annihilation operator of the exciton polariton 1405 in state p created after photons penetrate the device 1400, $\hat{d}_{p'}^+$ is a creation operator of exciton polariton state p' that is created as a result of electromagnetic interaction of the microwave radiation 1408 with the exciton polariton 1405. As the result of time evolution with the Hamiltonian (1), the microwave radiation 1408 and exciton polaritons 1405 entangle, that means they are described by a collective quantum mechanical wave function 1501 of the microwave radiation 1408 and exciton polaritons 1405 that cannot be separated into a product of quantum mechanical wave functions of the microwave radiation 1408 and exciton polaritons 1405. The general form of this collective quantum mechanical wave function $|\psi\rangle$ after the microwave radiation and exciton polariton interaction is the following, $$|\psi\rangle = a|\Psi_0 \Phi_1\rangle + b|\Psi_1 \Phi_0\rangle. \quad (15)$$

In equation (15), exciton polariton states $\Phi_0$ and $\Phi_1$ correspond to the states p' after the exciton polaritons 1405 interact with the microwave radiation 1408, a and b are quantum mechanical amplitudes characterizing the probabilities to measure the states $|\Psi_0 \Phi_1\rangle$ and $|\Psi_1 \Phi_0\rangle$, respectively, and $|a|^2+|b|^2=1$. The collective quantum mechanical wave function encodes information from the microwave radiation 1408 into the state of the trapped photon 1407 in the exciton polariton 1405 as follows. As seen from equation (15), if the exciton polariton state $\Phi_1$ is measured in the device 1400, then the state of the microwave radiation is $\Psi_0$. In contrast, if the exciton polariton state $\Phi_0$ is measured in the device 1400, then the state of the microwave radiation is $\Psi_1$. Therefore, the information from the microwave radiation 1408 can be restored by measuring photon states in the collective quantum mechanical wave function $|\psi\rangle$ 1501.

Figure 16:
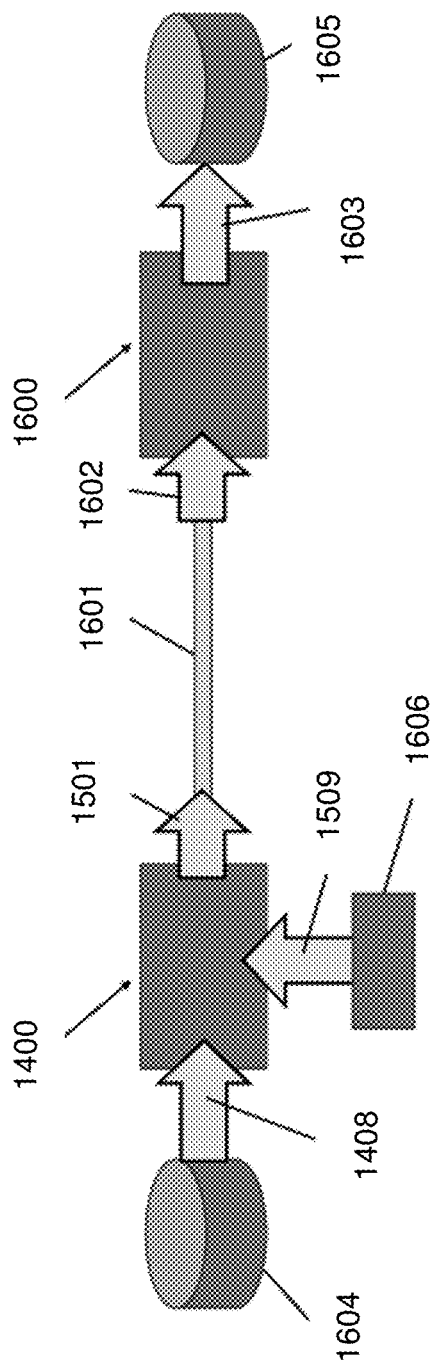
FIG. 16 is a schematic depiction of two devices connected in series.

The disclosed method to encode quantum information into optical states and send this information via an optical network 1601 is shown in FIG. 16. In FIG. 16 the microwave radiation 1408 is created by a source 1604. As is explained elsewhere in this specification, the source 1604 can be a cryogenic or ambient-temperature qubit or any other source of microwave radiation. In what follows, we assume that the source 1604 is a quantum computing qubit. In this case, the qubit emits the microwave radiation 1408 by transitioning from an excited state to a ground state. The microwave radiation 1408 enters the device 1400 and interacts with the exciton polaritons 1405 created by the photons 1509, which are generated by the photon source 1606. Optical radiation encoding wave function 1501 is coming out from the device 1400 via the first mirror 1401 or second mirror 1404. The optical radiation is the trapped photons 1407 of the exciton polaritons 1405 after the exciton polaritons 1405 interact with the microwave radiation 1408. The optical radiation is transmitted via an optical network 1601, which can be an optical fiber or free space. Optical radiation 1602 at an opposite end of the optical network 1601 enters another device 1600 installed on a receiver side. The device 1600 is substantially identical to device 1400. The optical radiation 1602 creates exciton polaritons in device 1600 installed on the received side. Exciton polaritons in the device 1600 installed on the receiver side emit microwave radiation 1603 due to the quantum process reciprocal to that described by the Hamiltonian (1). The microwave radiation 1603 interacts with qubit 1605 and trigger its transition to an excited state. Since all the processes between the source 1604 (on the emitter side) and the receiver 1605 on the receiving side are Hamiltonian, the quantum coherence is maintained throughout the whole information encoding and transmission between the source 1604 and receiver 1605. As noticed above in this paragraph, the source 1604 and receiver 1605 can be qubits in quantum computers or in information processing systems.

Numerical Simulations

To validate the disclosed method and device, we performed numerical simulations that encompasses the quantum dynamics of the microwave radiation 1408 interacting with the exciton polariton 1405 in the device 1400. In the numerical simulations, we used the cavity quantum electrodynamics formalism (M. Otten, S. K. Gray, and G. V. Kolmakov, "Optical detection and storage of entanglement in plasmonically coupled quantum-dot qubits," Physical Review A 99, 032339 (2019)). The quantum state of the system is described by the density operator $\hat{\rho}$. The evolution of density operator with time t obeys the Liouville equation, $$\frac{\partial \hat{\rho}}{\partial t} = -i\hbar [\hat{H}, \hat{\rho}] + \hat{L}(\hat{\rho}) \tag{16}$$

where i stands for the imaginary unit, $\hbar$ is the Planck's constant, [ . . . ] denotes the commutator operator, $\hat{H}$ is the Hamiltonian (1), $\hat{L}(\hat{\rho})$ is the Lindblad superoperator accounting for the processes of dissipation in the system. The initial condition is set to the state $\hat{\rho}_0 \equiv \hat{\rho}|_{t=0} = |\psi_0\rangle\langle\psi_0|$ where the microwave radiation and a single exciton polariton are presented, $|\psi_0\rangle = |n_c=1, n_{d_p}=1, n_{d_{p'}}=0\rangle$. Here, $n_c$ is the occupation number of the microwave radiation, $n_{d_p}$ is the occupation number of the exciton polariton before it interacted with the microwave radiation, and $n_{d_{p'}}$ is the occupation number of the exciton polariton after it interacted with the microwave radiation. Equation (16) were numerically integrated by using QuTiP numerical package. The population of the microwave radiation was calculated based on the results of the numerical integration for the density matrix according to the equation $n_c = \text{Tr}(\hat{\rho}\hat{c}^+\hat{c})$, where Tr denotes the operation of taking the trace of the operators. The populations of the exciton polariton before and after it interacted with the microwave radiation were calculated as $n_{d_p} = \text{Tr}(\hat{\rho}\hat{d}_p^+\hat{d}_p)$ and $n_{d_{p'}} = \text{Tr}(\hat{\rho}\hat{d}_{p'}^+\hat{d}_{p'})$, respectively.

Figure 17:
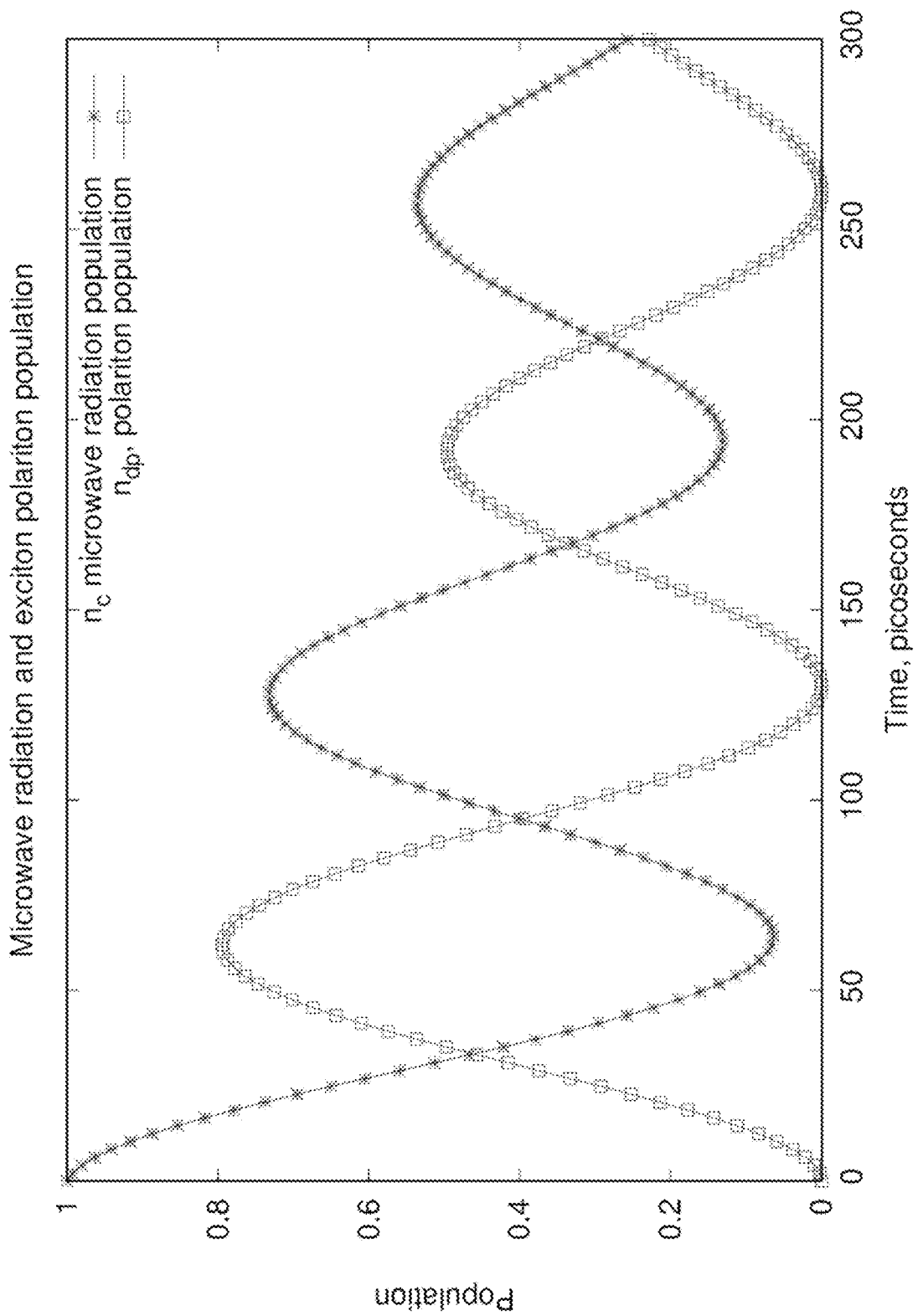
FIG. 17 is a graph depicting outcomes of numerical integration of Liouville equation (16). The curves show the oscillations with time t of the population of the microwave radiation (star symbols) and of the exciton polariton after it interacted with the microwave radiation in device 1400 (open box symbols)

The outcomes of the numerical integration of eq. (16) are shown in FIG. 17. The star symbols represent the time dependence of the population $n_c$ of the microwave radiation whereas the open box symbols represent the time dependence of the population $n_{d_{p'}}$ of the exciton polariton 1405 after it interacted with the microwave radiation 1408 in the device 1400. The time dependence of the population $n_{d_p}$ of the exciton polariton 1405 before it interacted with the microwave radiation 1408 coincides with that for the microwave radiation in FIG. 16. In the simulations, the rate of the interaction in the Hamiltonian (14) was set to γ=0.1 milli electron-Volt (meV). The dissipation rate for both the microwave radiation 1408 and exciton polaritons 1405 are set equal to 0.1γ=0.01 meV. It is seen that ≈0.78=78% of the microwave radiation 1408 were transformed to the exciton polariton 1405 at time t≈61.6 ps.

The population of both the microwave radiation and exciton polaritons in FIG. 17 oscillates with time due to Rabi oscillation stemming from their interactions. It is also seen that the oscillations damp with time due to the dissipation.

To characterize the quantum information encoding in the polariton state, we calculated the three-partite entanglement of the microwave radiation, the exciton polariton 1405 before it interacted with the microwave radiation 1408 and the exciton polariton 1405 after it interacted with the microwave radiation 1408. We calculate this three-partite entanglement as so-called "three-π" entanglement. The three-π entanglement, $\pi_{ABC}$ is defined as an average of residual entanglements of one subsystem with respect to the pair of other two subsystems, taken over the permutation of the particles, $$\pi_{ABC} = \frac{1}{3}(\pi_A + \pi_B + \pi_C) \tag{17}$$

where A, B, C mark the microwave radiation 1408 and exciton polaritons 1405, $$\pi_A = N_{A(BC)}^2 - N_{AB}^2 - N_{AC}^2, \tag{18}$$

$\pi_B$ and $\pi_B$ are obtained from the above equation by permutations of the subsystems, $N_{A(BC)}$ is the negativity of the system where the subsystem A is partially transposed and B and C remained unchanged, and the negativity is defined as double the sum of the negative eigenvalues of the density matrix $\hat{\rho}$, $N = \Sigma_i(|\lambda_i| - \lambda_i)$ where $\lambda_i$ are the eigenvalues the density matrix.

Figure 18:
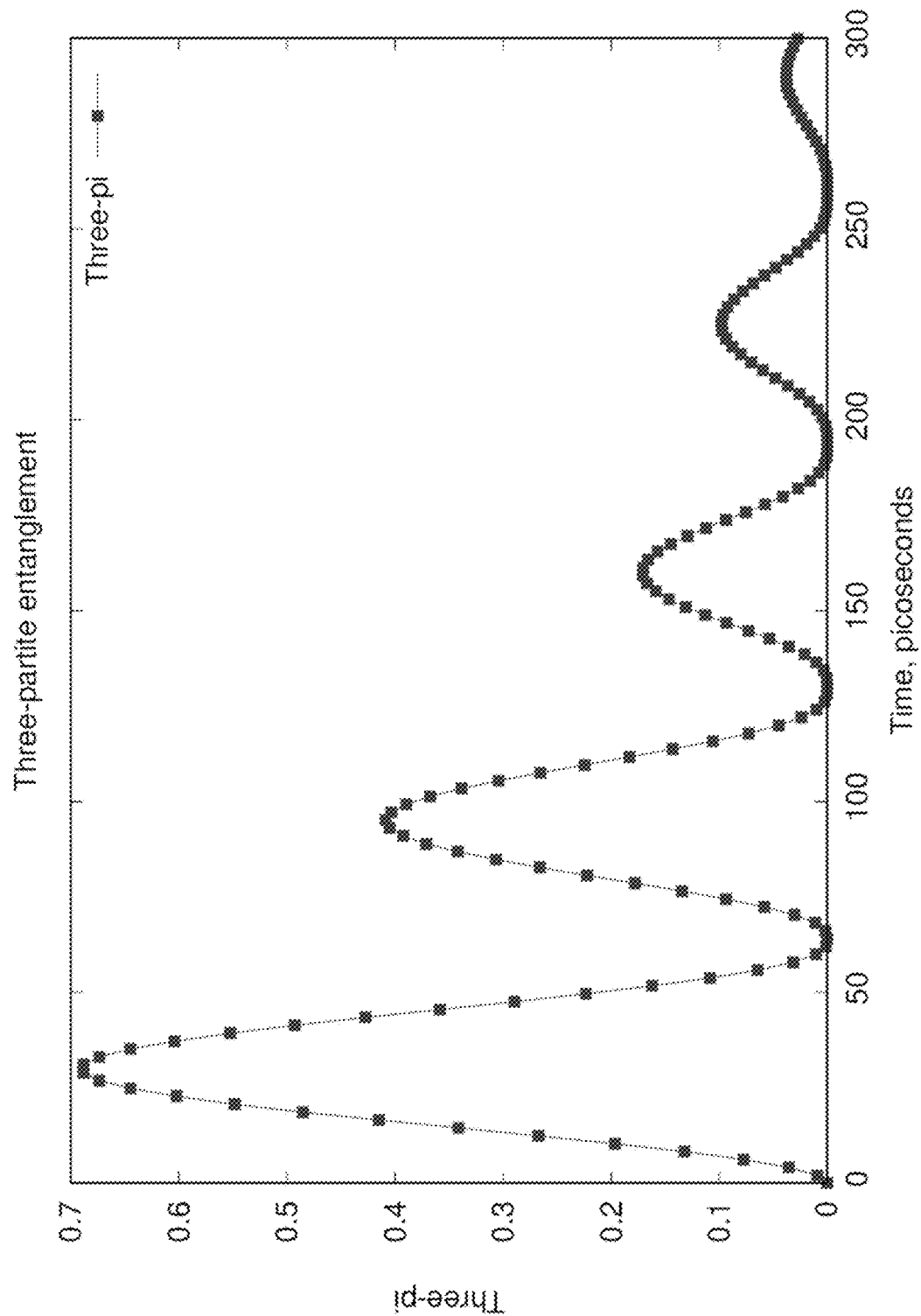
FIG. 18 is a graph depicting the results of three-partite entanglement, three-$\pi$ (or, $\pi_{ABC}$) of microwave radiation and exciton polariton before and after it interacts with the microwave radiation. The result is calculated from the numerical integration of eq. (16) with the same parameters as in FIG. 17.

The time dependence of the three-π entanglement of the microwave radiation 1408 and exciton polariton 1405 is shown in FIG. 18. The three-partite entanglement reaches $\pi_{ABC} \approx 0.690$ at t≈29.7 ps. As the reference point to compare the obtained value of $\pi_{ABC}$ with those known for other systems, $\pi_{ABC}=1$ for the Greenberger-Horne-Zeilinger state (GHZ state) and $$\pi_{ABC} = \frac{4}{9}(\sqrt{5} - 1) \approx 0.549$$

for the W state. Therefore, the disclosed method results is relatively high entanglement of the microwave radiation and exciton polaritons even in the damped systems.

Figure 19:
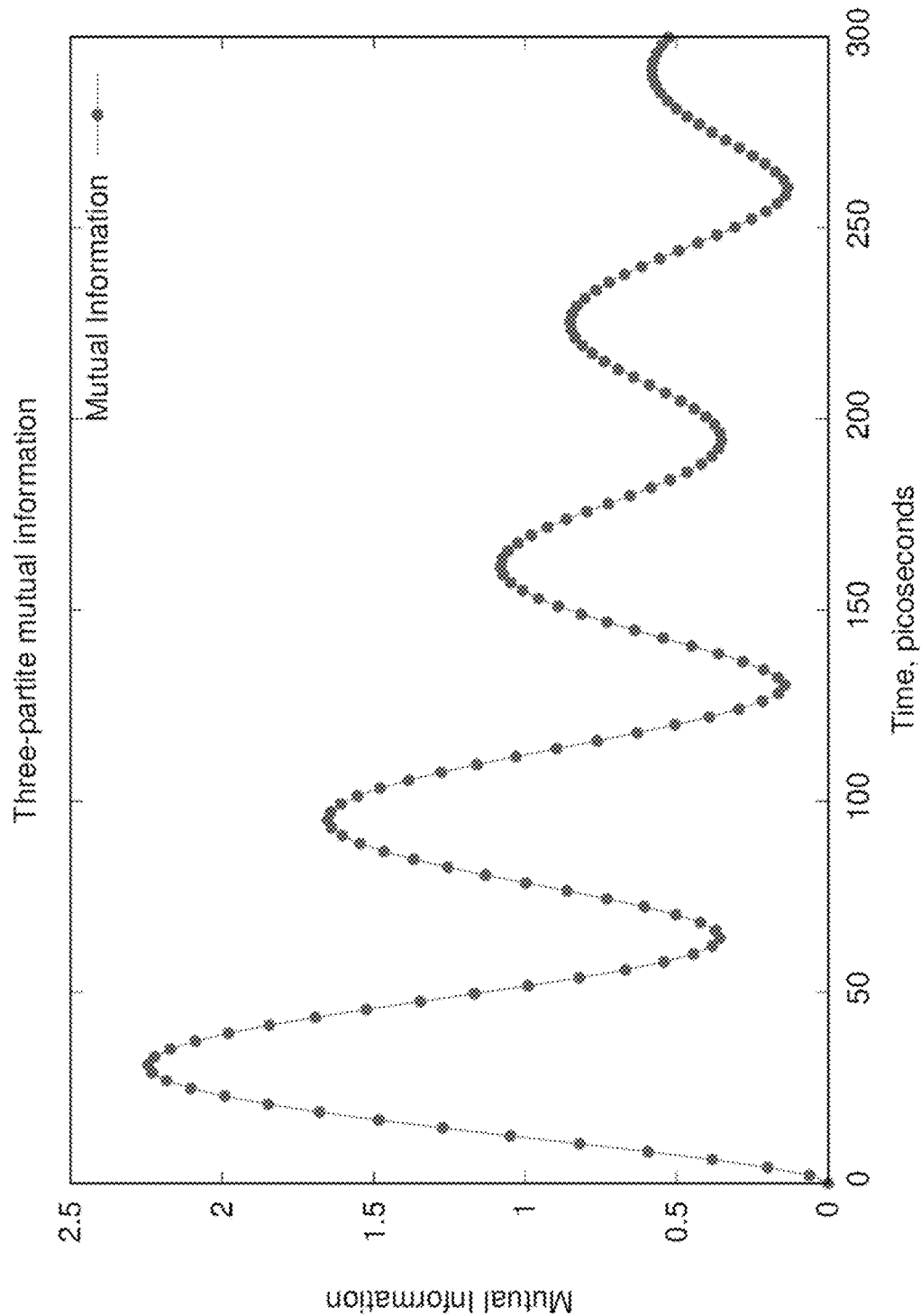
FIG. 19 is a graph depicting the results of three-partite mutual information for the microwave radiation and the exciton polariton before and after it interacted with the microwave radiation, as a function of time. The calculation was done for the same parameters as in FIG. 17.

To even more fully characterize the disclosed method of quantum information encoding into photon states, we calculated the three-partite mutual information for the microwave radiation and the exciton polariton before and after it interacted with the microwave radiation. The result of this calculation is shown in FIG. 19.

The three-partite mutual information was defined as:

$$I = S_A + S_B + S_C - S_{ABC} \qquad (19)$$

where A, B, C mark the microwave radiation, the exciton polariton before and after it interacted with the microwave radiation, as before. $S_{ABC}=-\text{Tr}(\hat{\rho} \log(\hat{\rho}))$ is von Neumann entropy of the state calculated for the full density matrix operator $\hat{\rho}$. The Neumann entropy for solely the microwave radiation, the exciton polariton, $S_A$, $S_b$, $S_C$ were calculated with the reduced density matrices where only those states (A, B, or C) particles were kept in $\hat{\rho}$ and all other states were traced away. The three-partite mutual information, I, captures information transfer between the quantum states. It is seen in FIG. 19 that the three-partite mutual information reaches I≈2.23 at t≈30.8 ps. It is worth noting that for an ideal system where we completely neglect the dissipation by setting the respective dissipation rate to zero, the three-partite mutual information reaches $I_0$≈3.0. Therefore, $$\frac{I}{I_0} \approx 0.743 = 74.3\%$$

of the information are transferred to the exciton polariton for the system with the dissipation.

For comparison, we present other state-of-the-art settings proposed to encode the quantum information of the microwave radiation into optical pulses. The piezoelectric optical cavity methodology enables ≈40% of the microwave radiation energy to transform to the optical pulses. The coupled optical ring resonators setting embedded in the piezoelectric cavity enables less that 1% of the energy conversion to the optical pulses. Therefore, the disclosed method and device enables ≈2× improvement of the energy conversion of the microwave radiation to optical pulses. One advantage of the disclosed method and device is that the disclosed method and device enable quantum information encoding into photon states to transmit information via an optical network that is, the functionality that was not demonstrated in prior art devices. The possibility to encode quantum information into photon states encompassing multiple photons enables one to have increased distance (100+ km) between the transmitter and receiver for the long-range information transmission via an optical network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electro-optical converter comprising:
   a first mirror;
   a first dielectric layer, contiguous with the first mirror, wherein the first dielectric layer is optically transparent;
   an optical input channel and an optical output channel, both of which extend along a first longitudinal direction which is parallel to the first mirror, the optical input channel and the optical output channel being partially embedded within the first dielectric layer;
   a semiconducting layer comprising (1) at least one TMX layer, wherein TM is a transition metal selected from a group consisting of W, Mo, In and Re and X is selected from a group consisting of Se, $Se_2$ and $S_2$ or (2) a semiconductor quantum well layer, wherein the semiconducting layer has a first surface and a second surface, the first surface being contiguous with the first dielectric layer;
   a second dielectric layer that is optically transparent and is contiguous with the second surface of the semiconducting layer;
   an input optical terminal and an output optical terminal, each partially embedded within the second dielectric layer and each contiguous with the semiconducting layer; and
   a second mirror.

2. The electro-optical converter as recited in claim 1, further comprising a first conductive layer disposed between the input optical terminal and the semiconducting layer and a second conducive layer disposed between the output optical terminal and the semiconducting layer.

3. The electro-optical converter as recited in claim 1, further comprising a gate that is between the input optical terminal and the output optical terminal.

4. The electro-optical converter as recited in claim 3, wherein the gate is at least partially embedded within the second dielectric layer.

5. The electro-optical converter as recited in claim 4, further comprising a third dielectric layer disposed between, and contiguous with, the semiconducting layer and the gate.

6. The electro-optical converter as recited in claim 1, wherein the semiconducting layer consists of a single-layer TMX layer, wherein TM is a transition metal selected from a group consisting of W, Mo, In and Re and X is selected from a group consisting of Se, $Se_2$ and $S_2$.

7. The electro-optical converter as recited in claim 1, wherein the semiconducting layer consists of a bi-layer with:
   a first $TM_1X_1$ layer wherein $TM_1$ is a transition metal selected from a group consisting of W, Mo, In and Re and $X_1$ is selected from a group consisting of Se, $Se_2$ and $S_2$;
   a second $TM_2X_2$ layer wherein $TM_2$ is a transition metal selected from a group consisting of W, Mo, In and Re and $X_2$ is selected from a group consisting of Se, $Se_2$ and $S_2$;
   wherein the first $TM_1X_1$ layer and the second $TM_2X_2$ layer are different.

8. The electro-optical converter as recited in claim 1, wherein the semiconducting layer is selected from a group consisting of GaAs/AlGaAs, ZnO, GaN, $Cu_2O$ and CuCl.

9. The electro-optical converter as recited in claim 1, wherein the semiconducting layer is less than 100 nm thick.

10. The electro-optical converter as recited in claim 1, wherein the second mirror is parallel to the first mirror.

11. The electro-optical converter as recited in claim 1, wherein the first mirror is slanted by an angle of 0.01 degree to 5 degrees relative to the second mirror.

12. The electro-optical converter as recited in claim 1, wherein the second mirror is slanted by an angle of 0.01 degree to 5 degrees relative to the first mirror.

13. The electro-optical converter as recited in claim 1, wherein the optical input channel and the optical output channel are separated by a gap of between 200 microns and 600 microns.

14. The electro-optical converter as recited in claim 13, wherein the gap comprises air-filled spaces.

15. The electro-optical converter as recited in claim 13, wherein the gap comprises optically transparent dielectric material.

16. The electro-optical converter as recited in claim 13, wherein the first mirror and the second mirror are separated by a distance 0.5 micrometer to 10 micrometers.

17. The electro-optical converter as recited in claim 13, wherein the semiconducting layer is made of a material selected from a group consisting of gallium arsenide (GaAs), aluminum gallium arsenide (AlGaAs), zinc oxide (ZnO), perovskite semiconductors, or a transition metal dichalcogenide, molybdenum disulfide ($MoS_2$), molybdenum diselenide ($MoSe_2$) and indium selenide ($In_2Se_3$).

18. The electro-optical converter as recited in claim 13, wherein the first dielectric layer and the second dielectric layer are made of aluminum gallium arsenide (AlGaAs), hexagonal boron nitride (h-BN) or silicon dioxide ($SiO_2$).

19. The electro-optical converter as recited in claim 13, wherein the semiconducting layer, the first dielectric layer and the second dielectric layer has a thickness from a nanometer to five hundred nanometers.

20. A system comprising at least a first electro-optical converter as recited in claim 1, and at least a second electro-optical converter as recited in claim 1, connected in a series via an optical network such that microwave radiation is conveyed from a microwave source to the input optical terminal of the first electro-optical converter, out of the output optical terminal of the first electro-optical converter and into the input optical terminal of the second electro-optical converter.

* * * * *